United States Patent

Imai

Patent Number: 5,222,394
Date of Patent: Jun. 29, 1993

[54] SYSTEM FOR DETECTING COMBUSTION CONDITION OF AN INTERNAL COMBUSTION ENGINE

[75] Inventor: Ryuichiro Imai, Musashino, Japan

[73] Assignee: Fuji Jukogyo Kabushiki Kaisha, Tokyo, Japan

[21] Appl. No.: 839,691

[22] Filed: Feb. 20, 1992

Related U.S. Application Data

[63] Continuation of Ser. No. 593,682, Oct. 5, 1990, abandoned.

[30] Foreign Application Priority Data

Oct. 18, 1989 [JP] Japan .................. 1-270826

[51] Int. Cl.$^5$ .......................................... G01M 15/00
[52] U.S. Cl. ............................................. 73/117.3
[58] Field of Search .................... 73/116, 117.2, 117.3; 364/511, 431.07, 431.08

[56] References Cited

U.S. PATENT DOCUMENTS

| 4,532,798 | 8/1985 | Kohama et al. | 364/511 |
| 4,977,508 | 12/1990 | Tanaka et al. | 364/431.08 |
| 5,041,981 | 8/1991 | Sekozawa et al. | 364/431.07 |

FOREIGN PATENT DOCUMENTS

| 59-82534 | 5/1984 | Japan . |
| 62-55461 | 3/1987 | Japan . |
| 63-196448 | 12/1988 | Japan . |
| 63-198473 | 12/1988 | Japan . |
| 63-202771 | 12/1988 | Japan . |

*Primary Examiner*—Robert Raevis
*Attorney, Agent, or Firm*—Martin A. Farber

[57] ABSTRACT

A period when the combustion of an engine is not performed is detected at two points before and after the top dead center of the cylinder in the expansion stroke. Engine speeds in both the periods are detected and the speed difference between the detected periods is calculated. Mean speed difference is calculated. The mean speed difference is compared with a predetermined limit value, thereby estimating combustion condition of the cylinder.

6 Claims, 25 Drawing Sheets

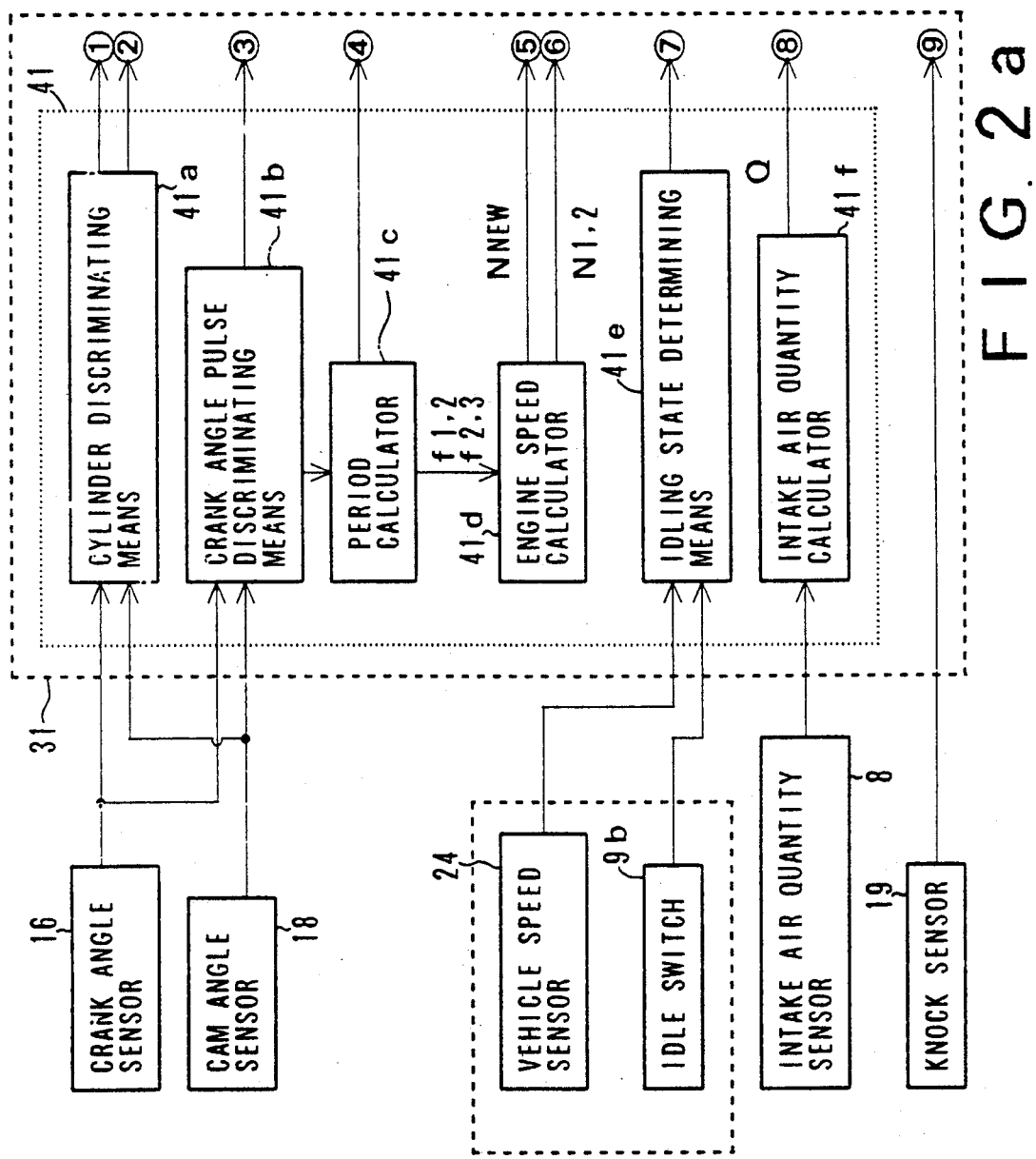

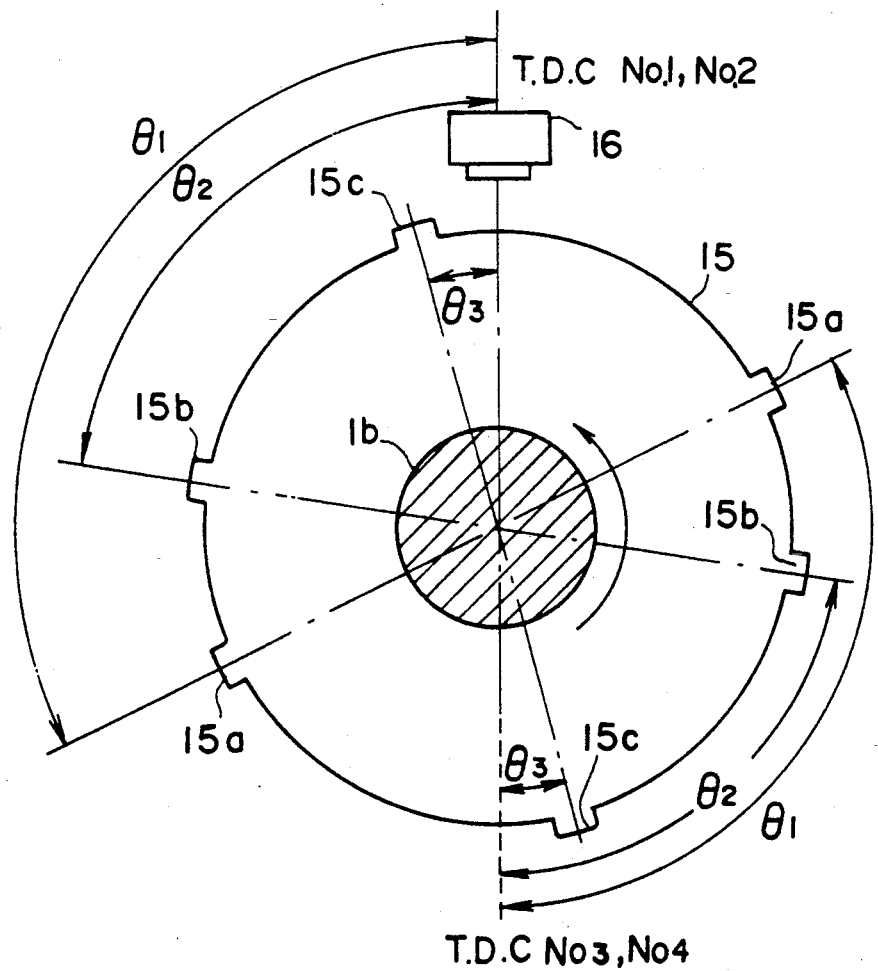

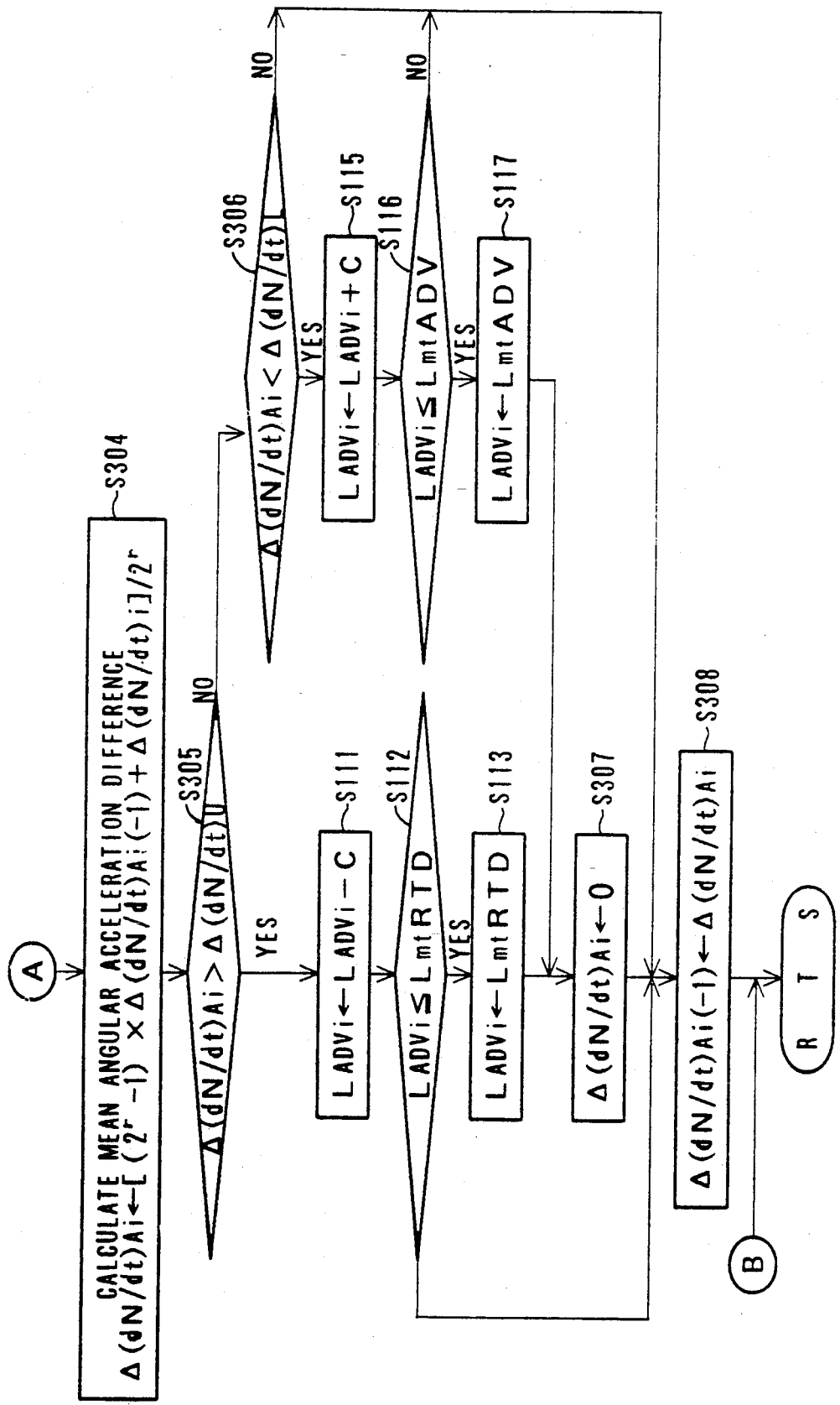

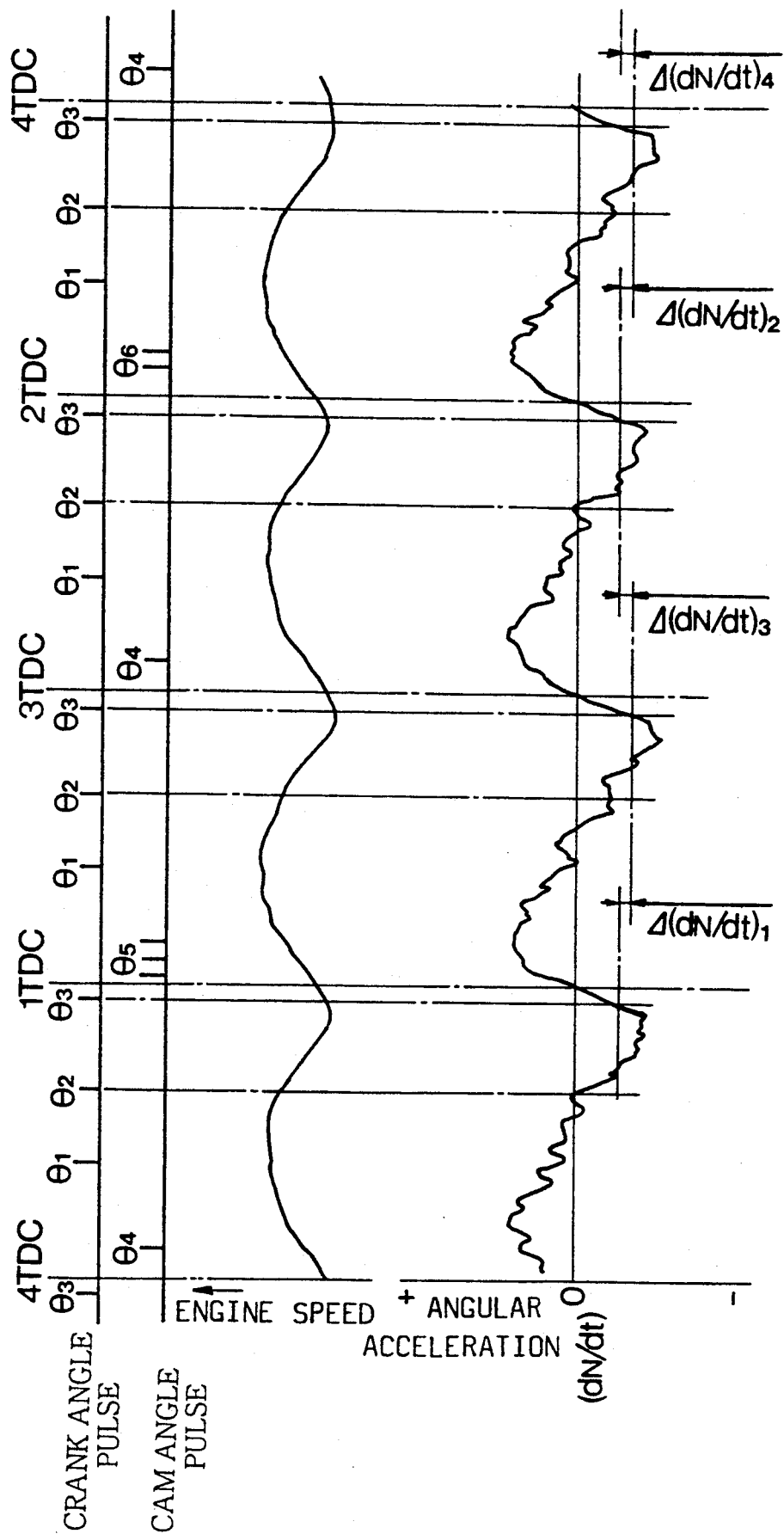

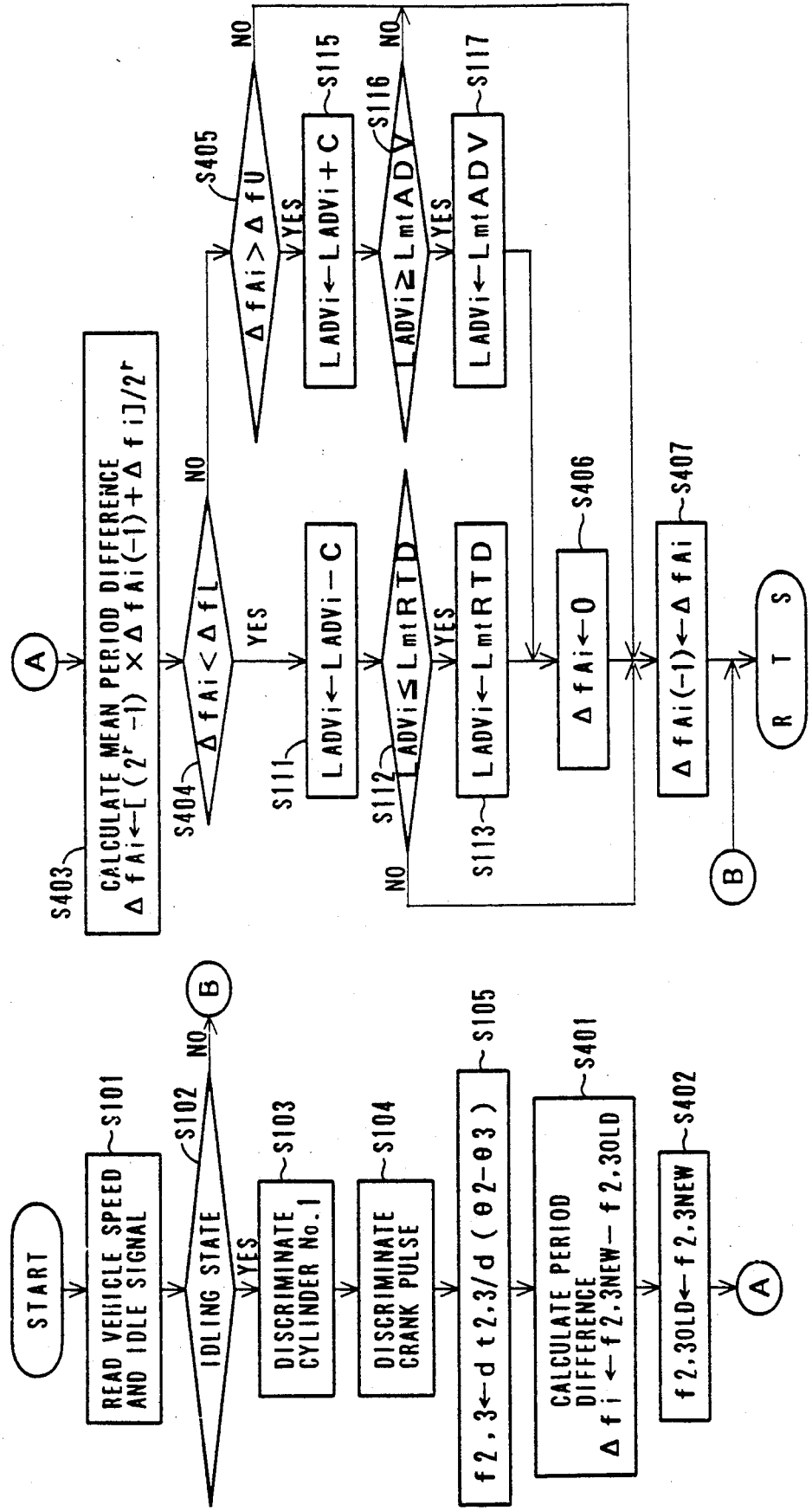

FIG. 16
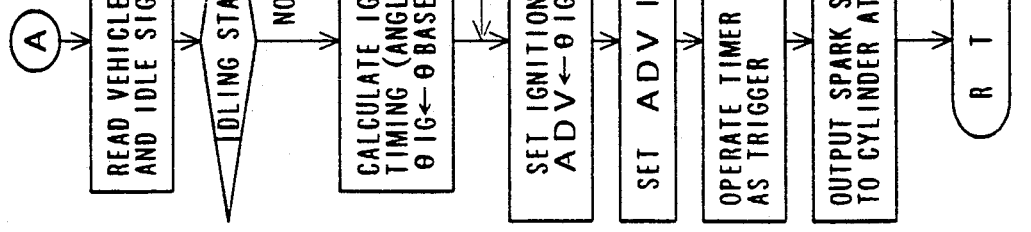
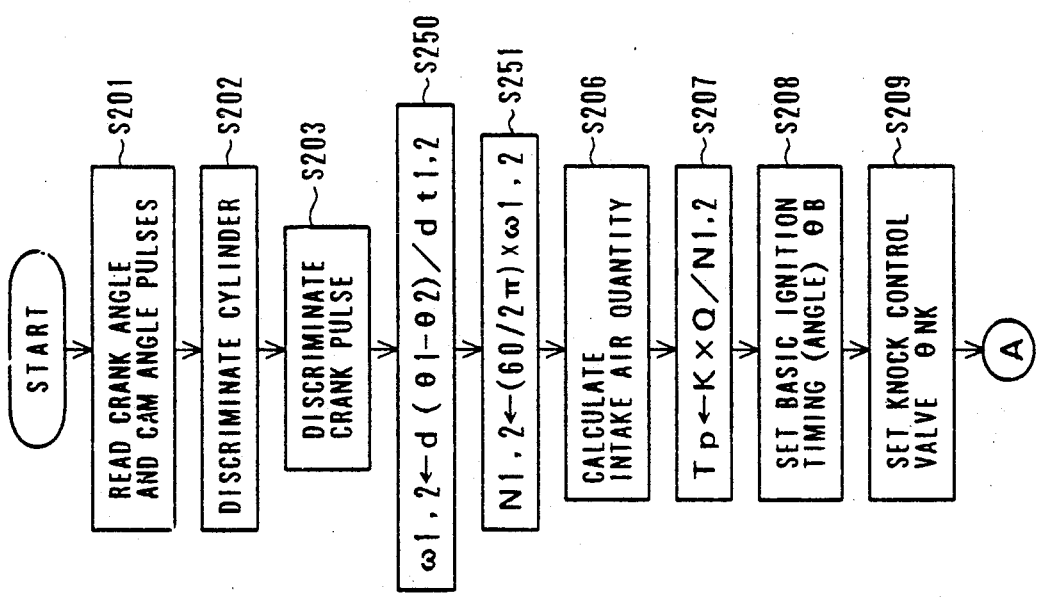

SYSTEM FOR DETECTING COMBUSTION CONDITION OF AN INTERNAL COMBUSTION ENGINE

RELATED APPLICATION

This application is a continuation of my co-pending application Ser. No. 07/593,682 filed Oct. 5, 1990, now abandoned.

BACKGROUND OF THE INVENTION

The present invention relates to a system for detecting a combustion condition which is available for controlling the ignition timing of an engine.

It is desirable to control the idling speed of the engine to a low speed in accordance with requirements for fuel economy and reduction of engine noise. However, a low idling speed causes fluctuation of the engine speed and hence reduction of starting characteristics of a motor vehicle driven by the engine. It is generally deemed that the differences between the combustion conditions of respective cylinders of the engine cause the fluctuation of the idling speed. The fluctuation of the combustion conditions are caused by the following differences.

1) The difference in distribution rate of intake air caused by a complicated configuration of an intake manifold and by interference between the intake-air distributed to respective cylinders;

2) The difference between combustion temperatures in respective cylinders, which is caused by a disposition of a coolant passage;

3) The differences in capacity of a combustion chamber, shape of a piston, etc., which are caused by the manufacturing tolerance;

4) The difference in air-fuel ratio in respective cylinders which is caused by the difference of the injected fuel amount.

It will be understood that the idling speed becomes constant by rendering the above described combustion conditions uniform.

Japanese Patent Application Laid-Open 62-55461 discloses a system for detecting combustion conditions in respective cylinders. The system has pressure sensors provided at every cylinder for detecting pressure in the cylinder. The combustion condition of each cylinder is estimated from the peak pressure of the detected pressures by each pressure sensor.

However, the system is costly because the pressure sensor is comparatively expensive. In addition, a cylinder head of the engine must be drilled for attaching the pressure sensor. Consequently, it is difficult to apply the system to conventional engines.

On the other hand, Japanese Patent Application Laid-Open 59-82534, Japanese Utility Model Applications Laid-Open 63-196448, 63-198473, and 63-202771 discloses systems for idling speed control systems. The systems detect instantaneous engine speeds before and after combustion in each cylinder, and the speed difference $\Delta Ni$ between both engine speeds is obtained from every cylinder. The systems control engine parameters so that the speed difference $\Delta Ni$ becomes zero, thereby causing the engine speed to be constant.

The systems calculate a deviation of the speed difference $\Delta Ni$ from a standard value which is an average value of speed differences at all cylinders. However, the average value is subject to fluctuate in accordance with engine combustion conditions. As a result, combustion condition factors other than the detecting cylinder are included in the combustion conditions for the cylinder, so that the combustion conditions can not be accurately detected. Therefore, the idling speed is not controlled to a predetermined value, because ignition timing and the quantity of injected fuel for each cylinder are determined on the basis of the estimated combustion conditions.

SUMMARY OF THE INVENTION

An object of the present invention is to provide a system which may accurately detect combustion condition of each cylinder, thereby properly controlling ignition timing of each cylinder so as to control idling speed to a predetermined value.

Another object of the present invention is to provide a combustion condition detecting system which may be manufactured at a low cost and simply applied to conventional engines.

A further object of the present invention is to provide a system which may be used for controlling the idling speed to a constant low value, thereby reducing noises at idling of the engine and ensuring optimum starting characteristics for a vehicle.

According to the present invention, there is provided a system for detecting combustion condition of an internal combustion engine, comprising a crank angle sensor for detecting an angular position of a crankshaft of the engine and for producing a crank angle signal, a cam angle sensor for sensing an angular position of a camshaft of the engine and for producing a cam angle signal, stroke detecting means responsive to the cam angle signal for detecting a number of a cylinder in an expansion stroke and for producing a cylinder signal, detecting means responsive to the crank angle signal and the cylinder signal for detecting a period before and after a top dead center of the cylinder in the expansion stroke when said cylinder is without the combustion stroke, and for producing a period signal representing said period, speed detector means responsive to the signal for detecting a speed of the engine during said period and for producing a speed condition signal. A speed difference of before and after the top dead center is calculated, and a mean difference of said sequential differences is calculated. The mean difference is compared with a predetermined limit value, thereby estimating a combustion condition of the cylinder.

In an aspect of the invention, the speed is substituted for angular acceleration of the engine, a rotational period of the crankshaft of the engine, and angular velocity of the engine.

The other objects and features of this invention will become understood from the following description with reference to the accompanying drawings.

BRIEF DESCRIPTION OF DRAWINGS

FIGS. 2a to 2c show a block diagram of an electronic control unit;

FIG. 3 shows a crankshaft disk with a crank angle sensor provided in the system;

FIGS. 10a and 10b show the flowchart showing an operation for detecting the combustion condition of the second embodiment;

FIG. 11 is a time chart showing a relation of a crank pulse, a cam pulse, engine speed and angular acceleration of the second embodiment;

FIG. 13 is the flowchart showing the operation for detecting the combustion condition of the third embodiment;

FIG. 16 is the flowchart of the operation for the ignition timing control of the fourth embodiment.

DETAILED DESCRIPTION OF THE PREFERRED EMBODIMENTS

Figure 1:
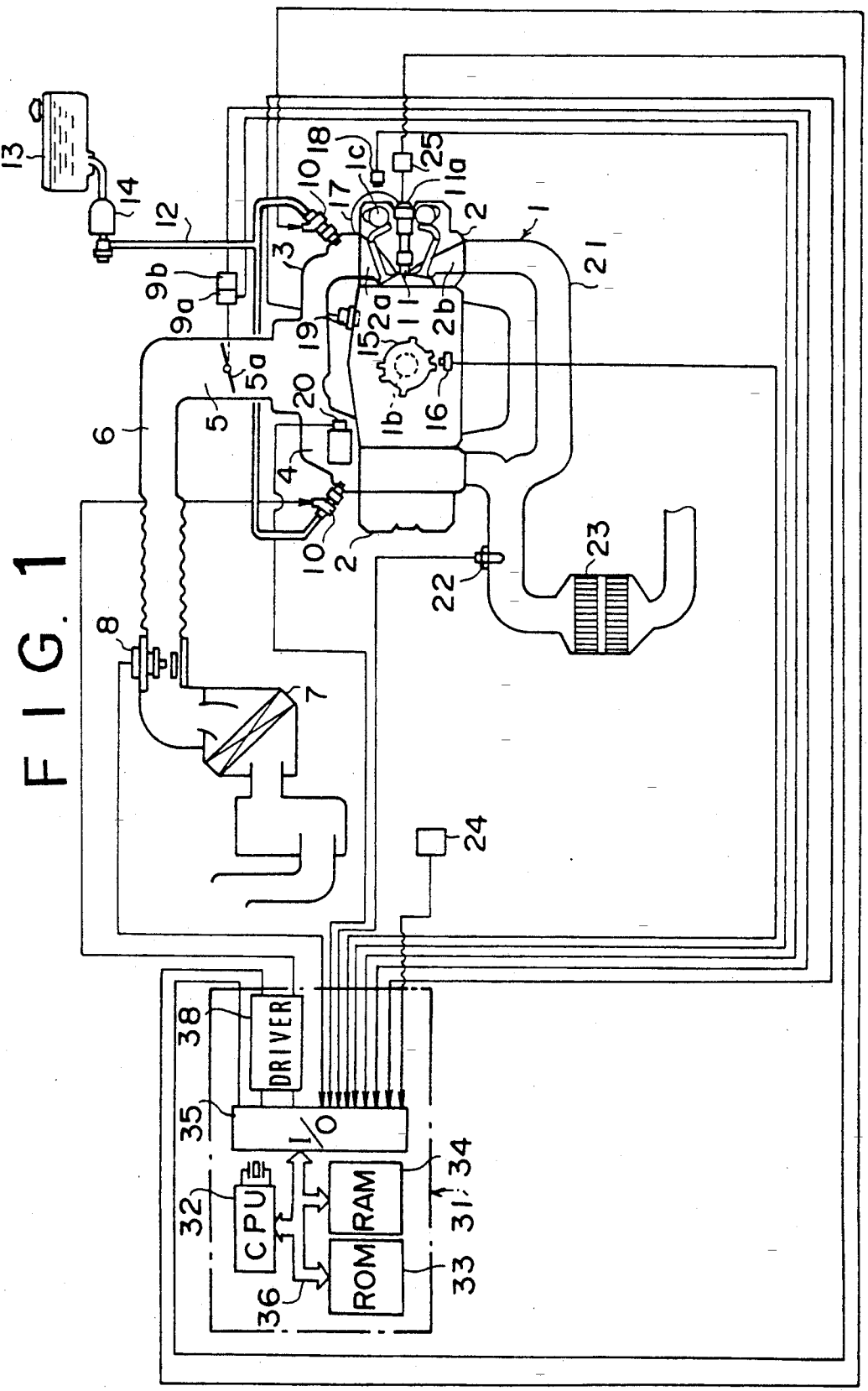
FIG. 1 is a schematic illustration of a system according to the present invention.

Referring to FIG. 1 showing a horizontal opposed type four-cylinder engine 1, a cylinder head 2 of the engine 1 has intake ports 2a and exhaust ports 2b which are communicated with an intake manifold 3 and an exhaust manifold 21, respectively. A spark plug 11 having an ignition coil 11a is located in each combustion chamber formed in the cylinder head 2. A throttle chamber 5 having a throttle valve 5a is communicated with the intake manifold 3 through an air chamber 4. The throttle chamber 5 is communicated with an air cleaner 7 through an intake pipe 6.

An intake air quantity sensor 8 (hot wire type air-flow meter) is provided in the intake pipe 6 downstream of the air cleaner 7. A throttle position sensor 9a is provided for detecting the opening degree of the throttle valve 5a. An idle switch 9b is provided adjacent the throttle position sensor 9a for detecting the throttle valve 5a at its idling position. Fuel injectors 10 are provided in the intake manifold 3 adjacent every intake port 2a. Fuel in a fuel tank 13 is supplied to the injectors 10 through a fuel passage 12 having a pump 14. A crankshaft disk 15 is secured to a crankshaft 1b of the engine 1. A crank angle sensor 16 (magnetic pickup) is provided adjacent the crankshaft disk 15 for detecting crank angles.

A camshaft disk 17 is secured to a camshaft 1c for detecting camshaft angles. The camshaft 1c rotates once while the crankshaft 1b rotates twice. A cam angle sensor 18 is provided adjacent the camshaft disk 17.

Referring to FIG. 3, the cylinders of the engine 1 are divided into two groups. A first group consists of No.1 and No.2 cylinders, and a second group consists of No.3 and No.4 cylinders. Top dead centers of the two cylinders in each group have the same timing. The crankshaft disk 15 has a pair of projections 15a disposed at a crank angle $\theta 1$ before the top dead center (BTDC), a pair of projections 15b disposed at a crank angle $\theta 2$ (BTDC), and a pair of projections 15c disposed at a crank angle $\theta 3$ (BTDC). The projections 15a, 15b, 15c are provided for detecting proper timings for calculating the instantaneous engine speeds. A period f1.2 is calculated from an elapsed time between the projections 15a and 15b (here $f = 1/\omega$ $\omega$: angular velocity). A period f2.3 is calculated from the elapsed time between the projections 15b and 15c. The crank angle $\theta 2$ of the projection 15b represents a reference crank angle for determining an ignition timing.

Figure 6:
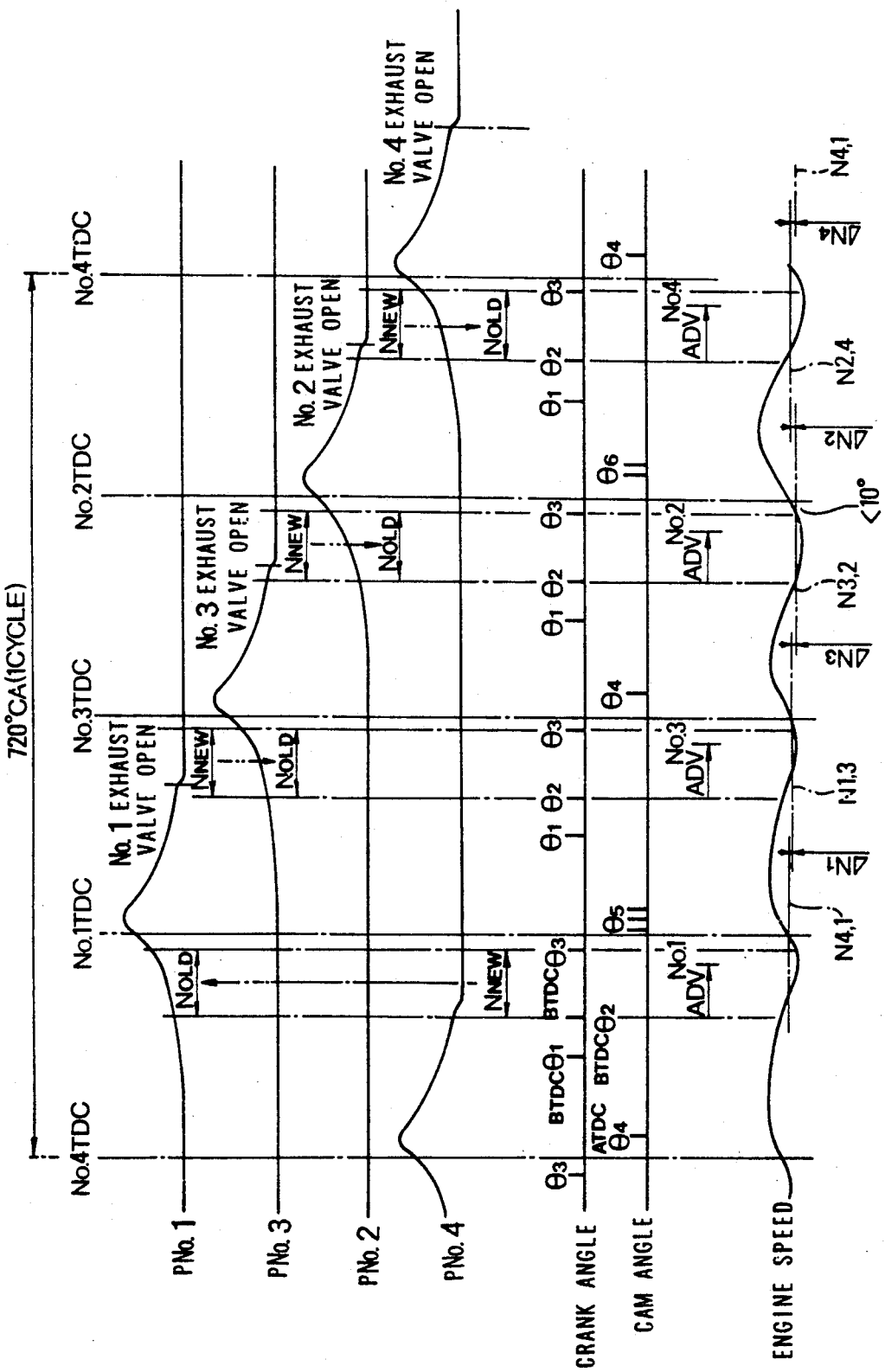
FIG. 6 is a time chart showing a variation of inner pressure of each cylinder, a crank angle pulse, a cam angle pulse and engine speed.

Referring to FIG. 6, the crank angles $\theta 2$ and $\theta 3$ of the projections 15b and 15c are determined at positions before and after an ignition timing (time) ADV at idling of the engine 1. The ignition timing at the idling of the engine 1 is usually determined at BTDC 20°CA. Even if the spark plug 11 is ignited at that timing, the combustion pressure is not rapidly increased till BTDC 10°CA.

Furthermore, an opening time of the exhaust valve of each cylinder is set at a slightly retarded timing from the ignition reference crank angle $\theta 2$. Since the combustion pressure immediately after opening the exhaust valve is rapidly reduced, there is no influence of the combustion pressure at the crank angle $\theta 3$.

Consequently, if the crank angle $\theta 3$ of the projection 15c is set at an advanced timing from the BTDC 10°CA, a period between the crank angles BTDC $\theta 2$ and $\theta 3$ of the projections 15b and 15c is not influenced by the combustion pressure of each cylinder. In other words, in the period between $\theta 2$ and $\theta 3$, there is no influence of physical work caused by combustion.

When the crankshaft disk 15 rotates, the crank angle sensor 16 detects positions of the projections 15a, 15b and 15c and produces signals in a form of pulses.

Figure 4:
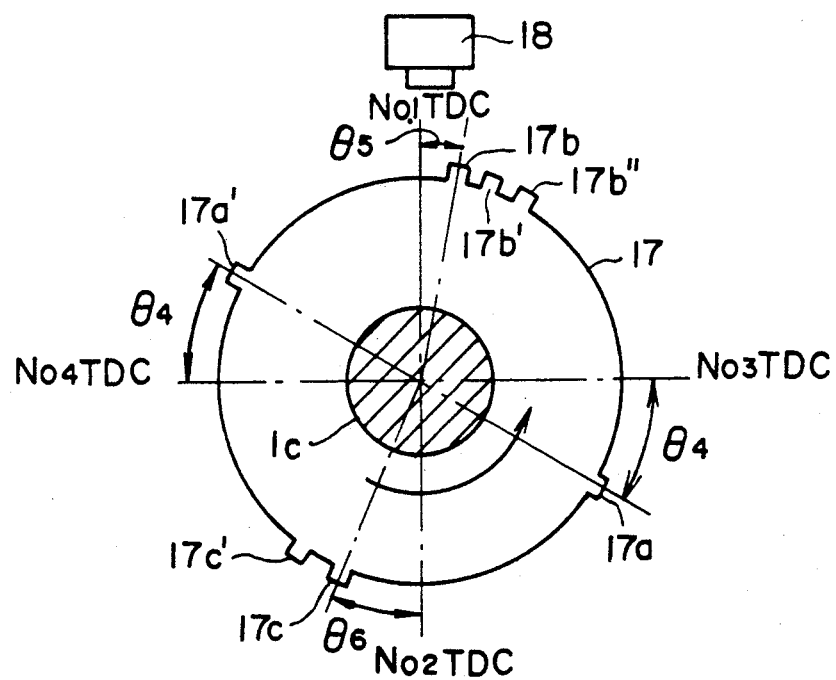
FIG. 4 shows a camshaft disk having a cam angle sensor provided in the system.

Referring to FIG. 4, the camshaft disk 17 is provided with a projection 17a, a pair of projections 17c and 17c', a projection 17a', and three projectons 17b, 17b' and 17b'' on an outer periophery thereof. Projections 17a, 17b, 17c and 17a' are positioned according to a firing (igniting) order of the cylinder. Namely, the projections 17a and 17a' represent No.3 and No.4 cylinders, disposed at a cam shaft angle $\theta 4$ after the top dead center (ATDC) in the compression stroke, the projections 17b to 17b'' represent the No.1 cylinder and the projection 17b is disposed at a cam angle ATDC $\theta 5$, and the projections 17c and 17c' represent the No.2 cylinder and the projection 17c is disposed at a cam angle ATDC $\theta 6$. The cam angle sensor 18 detects the projections to produce a cam angle signal representing the number of the cylinder in the form of the pulses.

In the illustrative embodiment, the angle $\theta 1$ is 97°CA, angle $\theta 2$ is 65°CA, $\theta 3$ is 10°CA, $\theta 4$ is 20°CA, $\theta 5$ is 5°CA, $\theta 6$ is 20°CA and $\theta(2\text{-}3)$ is 55°CA.

As shown in FIG. 6, when the cam angle sensor 18 detects the position of the projection 17b at angle $\theta 5$, it is determined that the crank angle pulse signal produced by the crank angle sensor 16 after the cam angle pulse signal of the angle $\theta 5$ represents the top dead center of the No.3 cylinder. When the cam angle sensor 18 detects the projection 17a at angle $\theta 4$, it is determined that the crank pulse signal produced after the cam signal $\theta 4$ represents the top dead center of the No.2 cylinder.

Similarly, the crank pulse signal produced after the cam pulse signal of the projection 17c at angle $\theta 6$ represents the No.4 cylinder and the crank pulse signal produced after the cam pulse signal of the projection 17a at angle $\theta 4$ represents the No.1 cylinder.

Furthermore, the crank pulse signal produced after the cam pulse signal represents a basic crank angle $\theta1$ of the corresponding cylinder.

In order to detect knocking, a knock sensor 19 (FIG. 1) is mounted on a body of the engine 1 to detect oscillation of the engine 1. A coolant temperature sensor 20 is provided in a coolant jacket (not shown) of the engine 1.

An O$_2$-sensor 22 and a catalytic converter 23 are provided in an exhaust passage which communicates with the exhaust manifold 21. Numeral 24 designates a vehicle speed sensor.

An electronic control unit 31 having a microcomputer comprises a CPU (central processing unit) 32, a ROM 33, a RAM 34 and an input/output interface 35, which are connected to each other through a bus line 36. Sensors 8, 9a, 16, 18, 19, 20, 22, 24 and the idle switch 9b are connected to an input port of the input/output interface 35. An output port of the interface 35 is connected to the spark plug 11 of the corresponding cylinder through an ignitor 25 and a driver 38 which is connected to the injectors 10.

Control programs and fixed data such as an ignition timing map are stored in the ROM 33. Output signals of the sensors are stored in the RAM 34. The RAM 34 stores output signals of the sensors after processing data in the CPU 32. The CPU 32 calculates a fuel injection pulse width and ignition timing in accordance with the control programs in the ROM 33 and based on various data in the RAM 34.

Figure 2B:
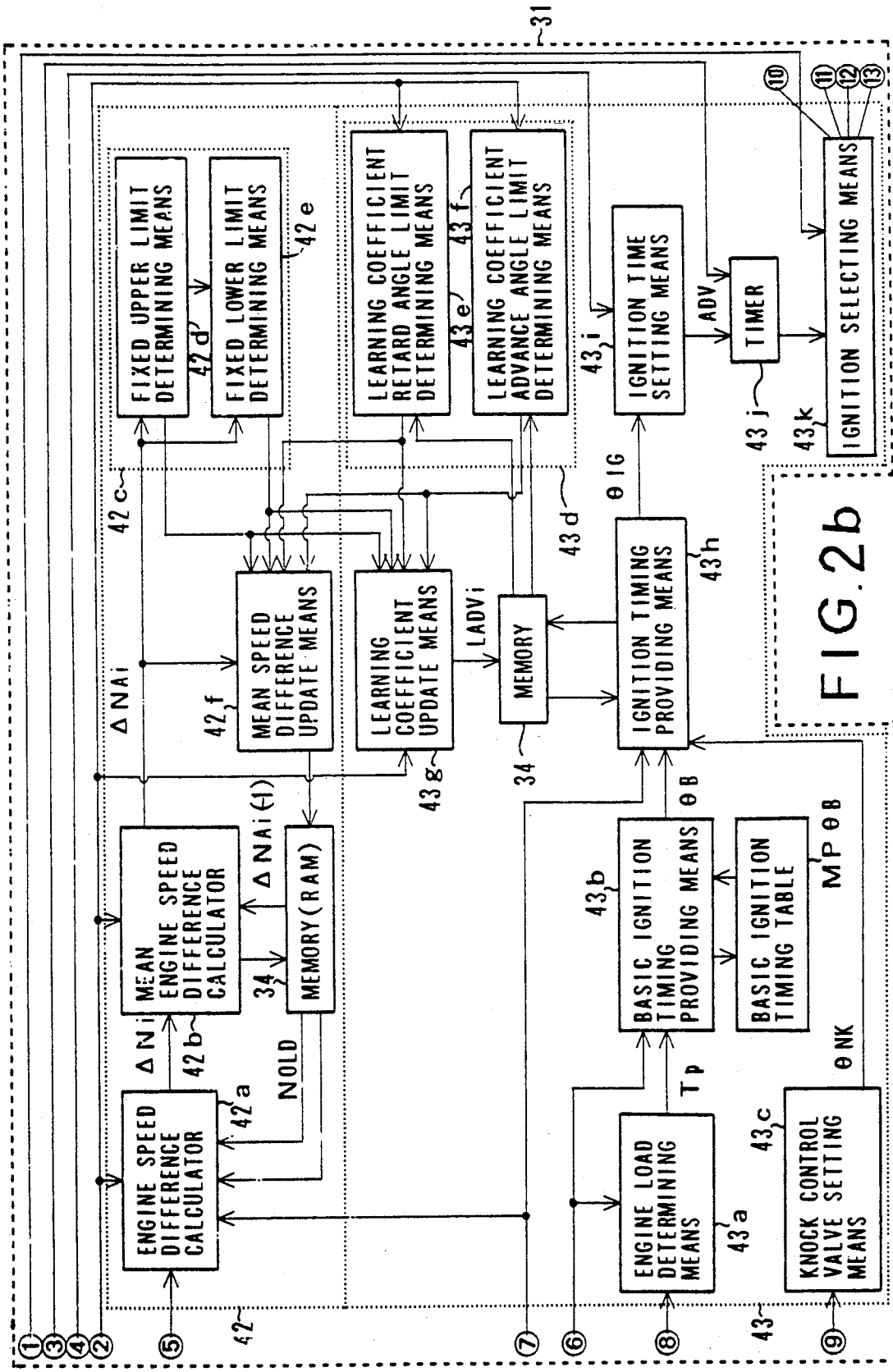
Figure 2C:
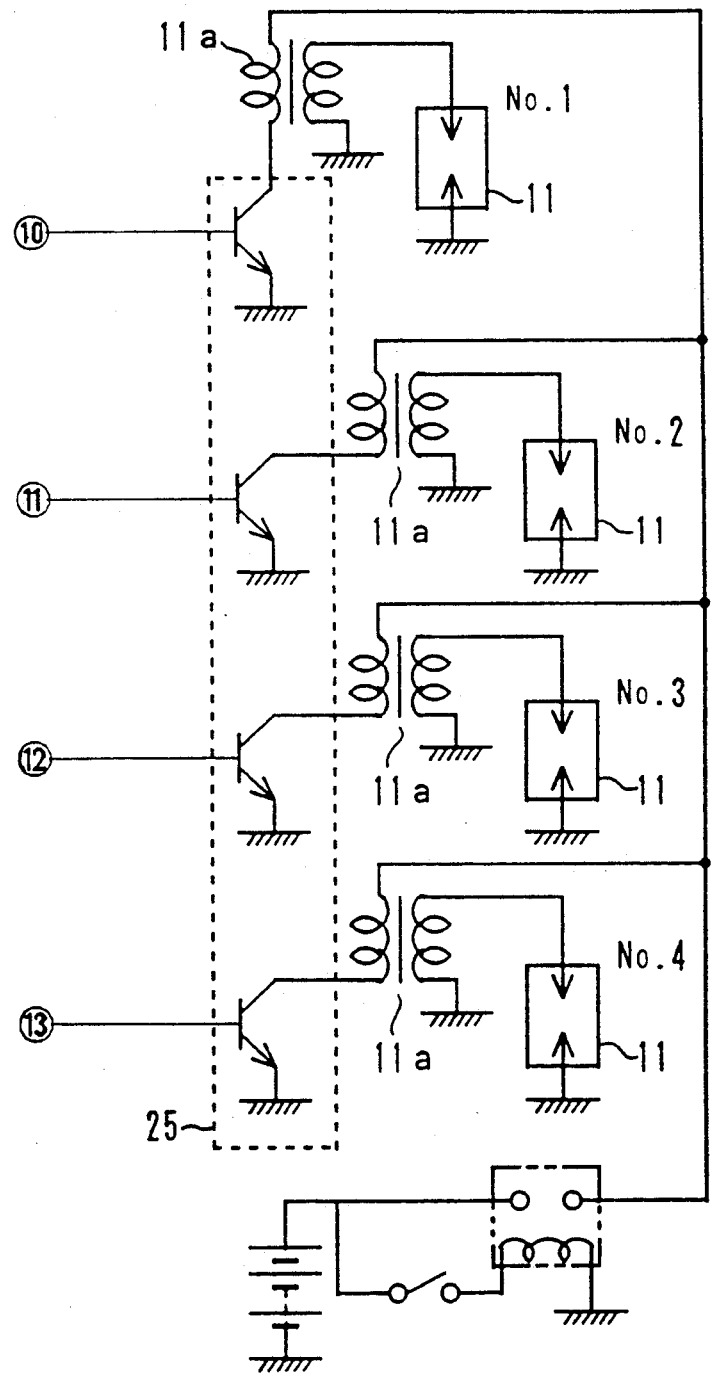

Referring to FIG. 2a–2c, the control unit 31 comprises an input data calculating section 41, a combustion condition detecting section 42 and an ignition timing calculating section 43. The input data calculating section 41 has cylinder discriminating means 41a to which the crank pulse signal of the crank angle sensor 16 and the cam pulse signal of the cam angle sensor 18 are applied. The means 41a discriminates the number of the cylinders No. i (i=1, 3, 2, 4) in accordance with the crank pulse generated after the cam pulse based on the number of the cam pulses of the projections.

Crank angle signal discriminating means 41b is applied with the crank angle signal and the cam angle signal from the sensors 16 and 18, the crank angle signal discriminating means 41b discriminating the crank angle signal generated after the cam angle signal dependent on the projections 15a, 15b and 15c. The signal is applied to a frequency calculator 41c where an elapsed time t1.2 between the crank angle $\theta1$ of the projection 15a and the crank angle $\theta2$ of the projection 15b is measured. The period (repetition rate) f1.2 is calculated in accordance with the elapsed time t1.2 and included angle ($\theta1-\theta2$)

$$\left( f1.2 = \frac{dt1.2}{d(\theta1 - \theta2)} \right).$$

Then, an elapsed time t2.3 between the crank angle $\theta2$ of the projection 15b and the crank angle $\theta3$ of the projection 15c is measured. The period f2.3 is calculated in accordance with the elapsed time t2.3 and included angle ($\theta2-\theta3$)

$$\left( f2.3 = \frac{dt2.3}{d(\theta2 - \theta3)} \right).$$

As aforementioned, the detecting period between the angles $\theta2$ and $\theta3$ is a zone between the combustion of the preceding cylinder and the combustion of the following cylinder, in which the work due to the combustion is not performed. Therefore, the engine speed does not rapidly change in the period, and hence the period f2.3 calculated in accordance with angles $\theta2$ and $\theta3$ is not affected by the combustion.

A period signal is applied to an engine speed calculator 41d for calculating engine speeds N1.2 and N NEW based on the periods f1.2 and f2.3

$$\left( N1.2 = \frac{60}{2\pi f1.2}, N\,NEW = \frac{60}{2\pi f2.3} \right).$$

Idling state determining means 41e is provided for determining the idling state of the engine in accordance with signals from the vehicle speed sensor 24 and the idle switch 9b. The idling state determining means 41e determines idling of the engine 1 when the vehicle speed is zero and an on-signal is applied form the idle switch 9b.

An intake air quantity calculator 41f calculates an intake air quantity in accordance with an output signal from the intake air quantity sensor 8.

The combustion state detecting section 42 comprises an engine speed difference calculator 42a which calculates an engine speed difference $\Delta Ni (i=1,3,2,4)$ of the corresponding cylinder at the idling of the engine. When the idling of the engine 1 is determined at the idling state determining means 41e, the calculator 42a reads the engine speed N NEW stored in a predetermined address of the memory (RAM) 34, which is calculated based on the period f2.3 at the engine speed calculator 41d, and reads an engine speed N OLD stored in the memory, which is calculated in the last routine based on the period f2.3. The calculator 42a calculates speed difference $\Delta Ni$ of the corresponding cylinder No.i discriminated at the cylinder discriminating means 41a in accordance with the difference between the engine speeds N NEW and N OLD. ($\Delta Ni = N\,NEW - N\,OLD$).

The engine speed N NEW is stored in the memory 34 to update the engine speed N OLD (N OLD ← N NEW).

The program for operating the control system starts at every 180 degree of the crankshaft 16. Consequently, the engine speed N NEW calculated on the basis of the period f2.3 performed for a cylinder of one of the groups is common to one of the cylinders of the other groups. For example, the engine speed N NEW of No.1 cylinder corresponds to the last engine speed N OLD for the No.3 cylinder.

If each engine speed common to both cylinders is represented as N4.1, N1.3, N3.2, and N2.4, respectively, the engine speed difference of each cylinder is expressed as follows.

$\Delta N1 = N1.3 - N4.1$ $\Delta N3 = N3.2 - N1.3$ $\Delta N2 = N2.4 - N3.2$ $\Delta N4 = N4.1 - N2.4$ An experiment proved that the engine speed difference $\Delta Ni$ correlates with an indicated mean effective pressure, namely the combustion conditions of the cylinder. Thus, the conditions of the combustion of each cylinder can be estimated by the speed difference $\Delta Ni$.

The relationship between the speed difference $\Delta Ni$ and the indicated mean effective pressure is described as follows.

The operation of the engine 1 is represented by an equation as follows.

$$I \cdot \frac{2\pi}{60} \cdot \frac{dN}{dt} = Ti - Tf \quad (1)$$

where
I : a moment of inertia
N : engine speed
Ti : indicated torque
Tf : friction torque.
Simplyfying the equation (1).

$$\frac{dN}{dt} \propto Ti - Tf \quad (2)$$

Further, substituting the pressure for torque, $$\frac{dN}{dt} \propto Pi - Pf \quad (3)$$

where
Pi : the indicated means effective pressure
Pf : effective pressure due to friction loss.

In accordance with the experiment, if the crank angle for detecting the engine speed and the duration of the crank angle for calculating the speed are provided at angles $\theta 2.3$, namely before and after the combustion of the cylinder, $dN/dt$ in the equation (3) is obtained on the basis of the engine speed difference $\Delta Ni$ and a change with time $\Delta T$ (180°CA) therebetween in the four-cycle engine. As a result, a close correlation can be obtained between the speed difference $\Delta Ni$ and the effective pressure.

In this case, variation of the time $\Delta T$ can be ignored and if a friction loss effective pressure Pf is constant, the following equation is obtained from the equation (3).

$$\Delta N = K \times Pi + PF \quad (4)$$

where K and Pf are constants.

Thus, by obtaining the speed difference $\Delta N$ of each cylinder, the indicated mean effective pressure Pi, namely the combustion conditions of each cylinder can be estimated.

If the speed difference $\Delta Ni$ at each period relative to the cylinder approaches zero, the combustion condition of each cylinder can be uniformed.

In the equation (3), if Pi is constant and regarded as a constant C, and K is a proportional constant, $dN/dt$ is:

$$\frac{dN}{dt} = K \cdot Pi - C \quad (5)$$

Thus, the indicated mean effective pressure Pi is obtained if the constants K and C are obtained.

In accordance with the equation (5), the indicated mean effective pressure Pi can be more accurately estimated from the speed difference $\Delta Ni$.

The engine speed difference $\Delta Ni$ is applied to a mean speed difference calculator 42b in which a mean speed difference $\Delta N$ Ai at the detecting period for the corresponding cylinder No. i is calculated in accordance with the speed difference $\Delta Ni$ and the last mean speed difference $\Delta NAi(-1)$ stored in a predetermined address of the memory 34 through a weighted mean by the equation:

$$\Delta NAi = ((2^r - 1) \times \Delta NAi(-1) + \Delta Ni)/2^r$$

where r is a weighted coefficient.

The mean speed difference at first time is zero.

The mean speed difference $\Delta NAi$ is calculated at every detecting period for respective cylinders.

The mean speed difference $\Delta NAi$ is calculated through the weighted means so that measuring error of the corresponding cylinder and the variation caused by temporary fluctuation of the engine speed can be corrected. The calculating operation which will be described hereinafter is performed based on data for each cylinder.

The mean speed difference $\Delta NAi$ is applied to a combustion condition estimating means 42c having fixed upper limit determining means 42d and fixed lower limit determining means 42e. The mean speed difference $\Delta NAi$ is first fed to the fixed upper limit determining means 42d. The mean difference $\Delta NAi$ is compared with a predetermined fixed upper limit speed difference $\Delta Nu$ which is previously provided in the means 42d. When $\Delta NAi \leq \Delta Nu$, the mean speed difference $\Delta NAi$ is applied to the fixed lower limit determining means 42e and compared with a fixed lower limit speed difference $\Delta NL$ which is previously provided in the means 42e.

These upper and lower fixed limit values $\Delta Nu$ and $\Delta NL$ are determined on the basis of upper and lower determining values of the indicated mean effective pressure obtained by the experiment.

When $\Delta NAi \geq \Delta NL$ at the fixed lower limit determining means 42e, namely the mean speed difference $\Delta NAi$ is within the range of the fixed limit speed difference ($\Delta Nu \geq \Delta NAi \geq \Delta NL$), a signal is applied to mean speed difference update means 42f. The update means 42f operates to update the last mean speed difference $\Delta NAi (-1)$ stored in the memory 34 with the mean speed difference $\Delta NAi$ ($\Delta NAi(-1) \leftarrow \Delta NAi$).

The ignition timing calculating section 43 comprises engine load determining means 43a in which an engine load Tp is calculated or derived from a lookup table based on the engine speed N1.2 from the engine speed calculator 41d and an intake air quantity Q from the intake air quantity calculator 41f. In the embodiment, the engine load Tp is calculated by the equation (Tp = K × Q/N K: constant).

The engine load Tp is applied to basic ignition timing providing means 43b which is applied with engine speed N1.2. In the means 43b, an ignition timing lookup table MP$\theta$B is retrieved in accordance with the engine speed N1.2 and the engine load Tp to derive a basic ignition timing (angle) OB.

Figure 5:
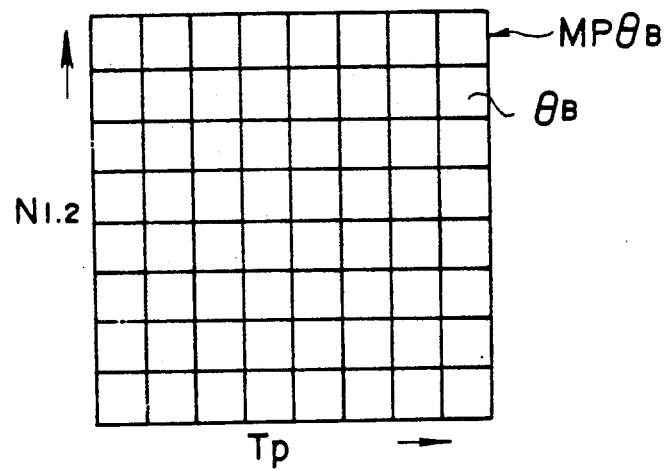
FIG. 5 shows a map of a basic ignition timing.

FIG. 5 shows the lookup table MP$\theta$B of the basic ignition timing is provided in the ROM 33 in which fixed data are stored. The table is a three-dimensional table in accordance with the engine load Tp and the engine speed N1.2 as parameters. The basic ignition timings which are previously provided by the experiment are stored in each crossing point.

The basic ignition timing $\theta B$ is applied to ignition timing providing means 43h in which the basic ignition timing $\theta B$ is corrected to provide an ignition timing $\theta IG$. The ignition timing providing means 43h is applied with signals from the idling state determining means 41e and knock control value setting means 43c.

The knock control value setting means 43c is provided for setting a knock control value $\theta NK$ for preventing the engine 1 from knocking. The means 43c is applied with an output voltage from the knock sensor 19. The output voltage is compared with a reference voltage which is previously provided in the means 43c. When the output voltage is lower than the reference voltage, no knock condition is determined. The knock control value $\theta NK$ is advanced by a predetermined crank angle $\theta$ ($\theta NK \leftarrow + \theta$).

When the output voltage is higher than the reference voltage, the occurrence of knocking is a determined. The control value $\theta NK$ is retarded by the angle $\theta$ for sufficiently preventing the engine 1 form knocking ($\theta NK \leftarrow -\theta$).

The basic ignition timing (angle) $\theta B$ is corrected in accordance with the knock control value $\theta NK$ to provide the ignition timing (angle) $\theta IG$ for the corresponding No. i cylinder ($\theta IG \leftarrow \theta B + \theta NK$).

When the idle signal from the means 41e is applied to the means 43h, the basic ignition timing $\theta B$ is corrected in accordance with a learning correcting coefficient LADVi stored in the memory 34 and the knock control value $\theta NK$ to provide the ignition timing ($\theta IG \leftarrow \theta B + \theta NK +$ LADVi).

The ignition timing calculating section 43 is provided with learning coefficient limit determining means 43d having learning coefficient retard angle limit determining means 43e and learning coefficient advance angle limit determining means 43f. The retard angle limit determining means 43e and the advance angle limit determining means 43f are provided with a retard angle limit correcting value LmtRTD and an advance angle limit correcting value LmtADV for each cylinder, respectively. Each of the limit determining means 43e and 43f compares the learning correcting coefficient LADVi for each cylinder stored in the memory 34 with the correcting value LmtRTD(LmtADV). When it is determined that the learning correcting coefficient LADVi exceeds the retard angle limit correcting value LmtRTD (LADVi $\leq$ LmtRTD), a signal is applied to each cylinder learning correcting coefficient update means 43g. The update means 43g operates to update the learning correcting coefficient LADVi stored in the memory 34 with the correcting value LmtRTD (LADVi $\leftarrow$ LmtRTD).

When it is determined that the learning correcting coefficient LADVi exceeds the advance angle limit correcting value LmtADV(LADVi $\geq$ LmtADV), the learning correcting coefficient LADVi is updated with the value LmtADV (LADVi $\leftarrow$ LmtADV). Thus, the learning correcting coefficient LADVi is provided within the range between the limit correcting values LmtRTD and LmtADV.

The learning correcting coefficient update means 43g is further applied with the signals from the fixed upper limit determining means 42d and the fixed lower limit determining means 42e of the combustion condition estimating means 42c.

When $\Delta NAi > \Delta Nu$ at the means 42d, which means that the combustion condition is extremely good, the learning correcting coefficient LADVi is corrected to retard with a predetermined crank angle C (for example, C = 1°CA). The update means 43g operates to update the learning coefficient LADVi with the retarded coefficient (LADVi $\leftarrow$ LADVi-C).

When $\Delta NAi < \Delta NL$ at the fixed lower limit determining means 42e, i.e. when the combustion condition is bad, the learning coefficient LADVi is corrected to advance with the crank angle C. The coefficient LADVi is updated with the advanced coefficient (LADVi $\leftarrow$ LADVi + C).

The ignition timing OIG is applied to an ignition time setting means 43i which is applied with the period f1.2 calculated at the frequency calculator 41c. The means 43i operates to set an ignition time ADV in accordance with the ignition timing $\theta IG$ and the period f1.2 (ADV = $\theta IG \times$ f1.2)

The ignition time ADV is set in a timer 43j which starts measuring time in accordance with the crank angle signal representing the reference angle $\theta 2$ detected by the means 43b as a trigger signal. When the timer reaches a set ignition time, a spark signal is applied to an ignition selecting means 43k. The means 43k produces a signal which is applied to the ignitor 25 of the corresponding cylinder No. i to cut off the circuit for the primary winding of the ignition coil 11a.

In the learning coefficient limit determining means 43d, if LADVi $\leq$ LmtRTD or LADVi $\geq$ LmtADV is determined at the means 43e or 43f, a signal is applied to the mean speed difference update means 42f for resetting the mean speed difference $\Delta NAi$ ($\Delta NAi \leftarrow 0$). Thus, the update means 42f operates to update the last mean speed difference $\Delta NAi(-1)$ in the memory 34 by the reset means speed difference $\Delta NAi$ $\Delta NAi(0)($ $\Delta NAi(-1)-0)$.

Namely, if the learning coefficient LADVi exceeds the range between the limit correcting values LmtRTD and LmtADV, the update means 43g determines both of the correcting values as the limit values of the learning coefficient. Consequently, the mean speed difference $\Delta NAi$ is reset to prevent an error which will be produced in the calculated result at the calculator 42b.

The operation of the system for estimating the combustion condition of the cylinder at idling of the engine is described hereinafter with reference to the flowchart of FIG. 7. The control program is executed on each individual cylinder.

At a step S101, a vehicle speed and an output signal of the idle switch are read during a driving state of the vehicle. At a step S102, the idling state is determined. When the vehicle speed is zero and the idle switch is turned on, the idling state is determined, and the program goes to a step S103. When the vehicle speed is not zero and the idle switch is turned off, the driving state of the vehicle is determined and the program terminates the routine.

At the step S103, the cylinder No. i in the expansion (combustion) stroke is discriminated in accordance with the cam pulses from the cam sensor 18. At a step S104, the crank pulses from the crank angle sensor 16 at crank angles BTDC $\theta 2$ and $\theta 3$ are discriminated with reference to the cam pulse at crank angles BTDC $\theta 2$ and $\theta 3$.

At a step S105, the period f2.3 is calculated in accordance with the elapsed time t2.3 between crank pulses discriminated at the step S104 and the included angle ($\theta 2 - \theta 3$) ( f2.3 = d t2.3/d ($\theta 2 - \theta 3$). At a step S106, the engine speed N NEW is calculated in accordance with the period f2.3 ( NNEW $\leftarrow 60/(2\pi \cdot$ f2.3 ) ).

At a step S107, in accordance with the difference between the engine speed N NEW and the engine speed N OLD calculated in the last routine, the engine speed difference $\Delta Ni$ in the non-working period ($\theta 2 - \theta 3$) (FIG. 6) is calculated ($\Delta Ni \leftarrow$ N NEW $-$N OLD). At a step S108, the engine speed N OLD stored in the memory is updated with the engine speed N NEW (N OLD $\leftarrow$ N NEW).

At a step S109, the mean speed difference $\Delta NAi$ is calculated through the weighted means based on the speed difference $\Delta Ni$ and a means speed difference $\Delta NAi(-1)$ in the last routine ( $\Delta NAi \leftarrow ((2^r-1) \times \Delta NAi(-a) + \leftarrow Ni)/2^r)$.

At a step S110, the mean speed difference $\Delta NAi$ is compared with fixed an upper limit speed difference $\Delta Nu$. When $\Delta NAi > \Delta Nu$, it is determined that the combustion condition is extremely good. The program goes to a step S111 where the learning correcting coefficient LADVi stored in the RAM 34 is updated with the coefficient LADVi corrected by retarding with the crank angle C (C = 1°CA) (LADVi $-$ LADVi-C).

At a step S112, the learning coefficient LADVi obtained at the step S111 is compared with the retard angle limit correcting value LmtRTD. When LADVi $>$ LmtRTD, it is determined that the coefficient LADVi does not reach the retard angle limit. The program goes to a step S119.

At the step S112, when LADVi $\leq$ LmtRTD, the coefficient LADVi reaches the retard angle limit. Thus, the program goes to a step S113 where the learning coefficient LADVi stored in the memory is updated with the correcting value lmtRTD (LADVi $\leftarrow$ LmtRTD).

On the other hand, at the step S110, when $\Delta NAi \leq$ Nu, the program goes to a step S114 where the mean speed difference $\Delta NAi$ is compared with the fixed lower limit speed difference $\Delta NL$. When $\Delta NAi <$ $\Delta NL$, it is determined that the combustion condition is bad. The program goes to a step S115 where the learning correcting coefficient LADVi in the RAM 34 is updated with the coefficient LADVi corrected with the advanced crank angle C (LADVi $\leftarrow$ LADVi + C).

At a step S116, the learning coefficient LADVi obtained at the step S115 is compared with the advance angle limit correcting value LmtADV. When LADVi $<$ Lmt ADV, it is determined that the coefficient LADVi does not reach the advance angle limit. The program goes to a step S119.

At the step S116, when LADVi $\geq$ Lmt ADV, the coefficient LADVi reaches the advance angle limit. Thus, the program goes to a step S117 where the learning coefficient LADVi stored in the memory is updated with the correcting value LmtADV (LADVi $\leftarrow$ LmtADV).

At the step S114, when $\Delta NAi \geq \Delta NL$, it is determined that the mean speed difference $\Delta NAi$ is in the range ($\Delta Nu \geq \Delta NAi \geq \Delta NL$), the program proceeds to the step S119.

At a step S118, the means speed difference $\Delta NAi$ is reset ($\Delta NAi \leftarrow 0$).

At the step S119, the last mean speed difference $\Delta NAi (-1)$ stored in the RAM is updated with the mean speed difference $\Delta NAi$ calculated at the step S109 or reset at the step S118.

The operation for controlling the ignition timing will be described with reference to the flowchart of FIG. 8. The ignition timing control is executed at every cylinder.

At a step S201, pulse signals from the crank angle sensor 16 and the cam angle sensor 18 are read.

At a step S202, the cylinder member is discriminated in accordance with the crank pulse and cam pulse. At a step S203, the crank pulse of the crank angle sensor 16 is discriminated in accordance with the cam pulse for detecting the angles BTDC $\theta 1$ and $\theta 2$.

At a step S204, the period f1.2 is calculated in accordance with the period t1.2 between the crank pulses discriminated at the step S203 and the angle ($\theta 1 - \theta 2$) (f1.2 = d t 1.2/d ($\theta 1 - \theta 2$)). At a step S205, the engine speed N1.2 is calculated in accordance with the period f1.2 (N1.2 $\leftarrow 60/(2\pi \cdot f1.2)$).

At a step S206, the intake air quantity Q is calculated based on the output signal from the intake air quantity sensor 8.

At a step S207, the engine load Tp is calculated in accordance with the engine speed N1.2 and the intake air quantity Q (Tp $\leftarrow$ K $\times$ Q/N1.2). At a step S208, the basic ignition timing $\theta B$ is derived from the lookup table MP$\theta B$ in accordance with the engine speed N1.2 and the intake air quantity Q as parameters.

At a step S209, the knock control value $\theta NK$ is set corresponding to the output signal from the knock sensor 19.

At a step S210, the vehicle speed and the output signal of the idle switch 96 are read. At a step S211, the idling state is determined. When the vehicle speed is not zero and the idle switch 96 is turned off, the driving state of the vehicle is determined and the program goes to a step S212. When the vehicle speed is zero and the idle switch 96 is turned on, the idling state is determined. The program goes to a step S213.

At the step S212, the basic ignition timing $\theta B$ is corrected with the knock control value $\theta NK$ to calculate the ignition timing $\theta IG$.

At the step S213, the learning correcting coefficient LADVi of the corresponding cylinder No.i determined in the combustion condition estimating program is read. At a step S214, the basic ignition timing $\theta B$ is corrected with the knock control value $\theta NK$ and the learning coefficient LADVi to calculate the ignition timing $\theta IG$ ($\theta IG \leftarrow \theta B + \theta NK +$ LADVi).

At a step S215, the ignition time ADV is provided in accordance with the ignition timing $\theta IG$ calculated at the step S212 or S214 and the period f1.2 calculated at the step S204 (ADV $\leftarrow \theta IG \times$ f1.2).

At a step S216, the ignition time ADV is set in the timer. At a step S217, the timer starts measuring time in accordance with the angle signal $\theta 2$ as a trigger signal. At a step S218, when the timer reaches a set ignition time, a spark signal is applied to the ignitor 25.

In accordance with the present invention, in the ignition timing control system at the idling of the engine, the basic ignition timing is corrected with the learning correcting coefficient which is used for estimating the combustion condition. Thus, the engine speed at idling becomes constant, thereby remarkably reducing fluctuation of the engine speed.

In order to estimate the combustion condition, the mean speed difference at a non-working period of each cylinder is obtained based on the speed difference between before and after the combustion in the cylinder and the mean speed difference is compared with the fixed upper and lower limit values. Therefore, factors of the other cylinders are not included, and the combustion condition is accurately detected.

In particular, the crank angle for detecting the engine speed during the detecting period in the non-working state is common to every cylinder so that the load exerted on the control unit can be reduced.

Figure 7:
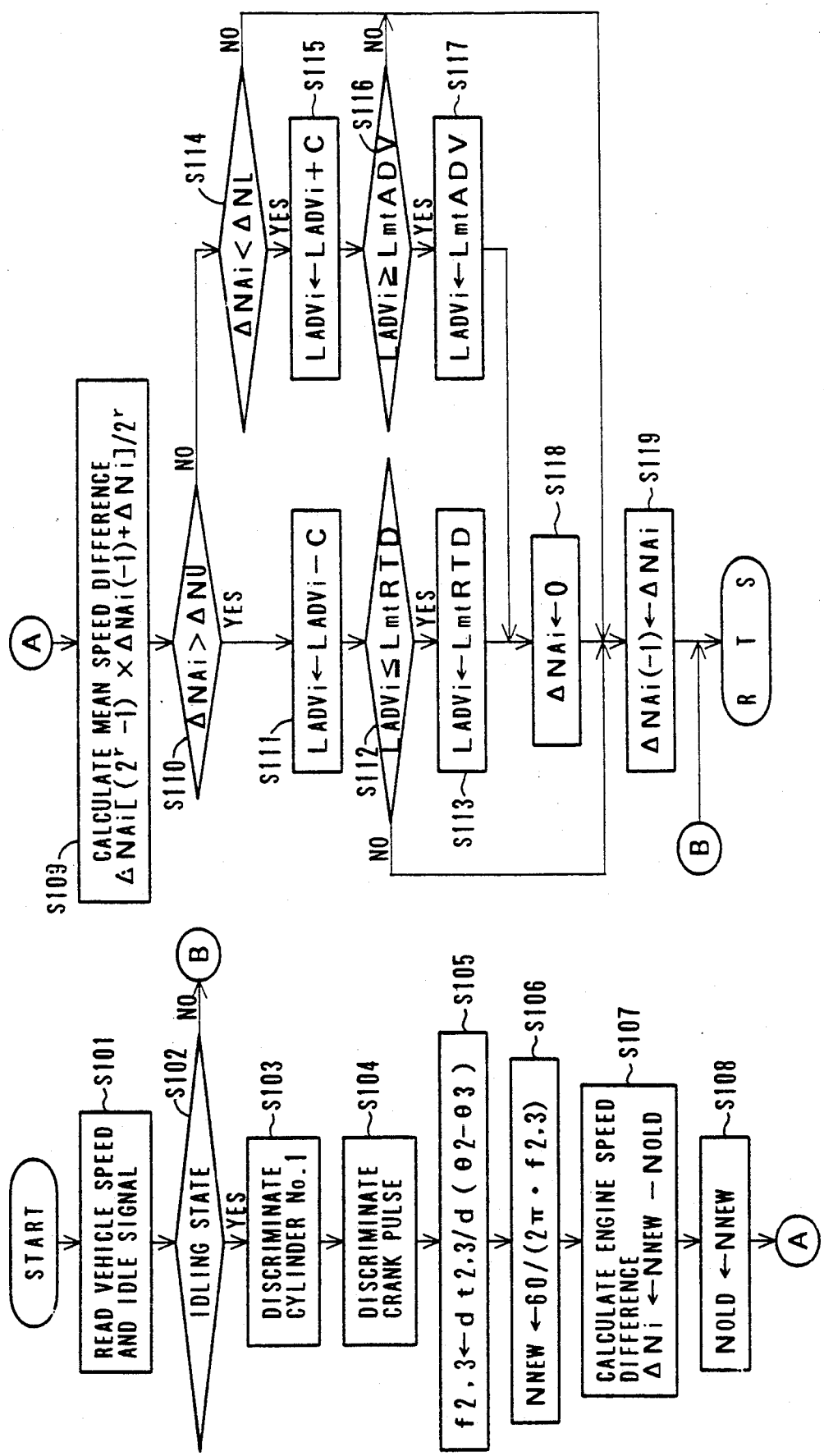
FIG. 7 shows a flowchart showing for estimating combustion condition of the cylinder.
Figure 9A:
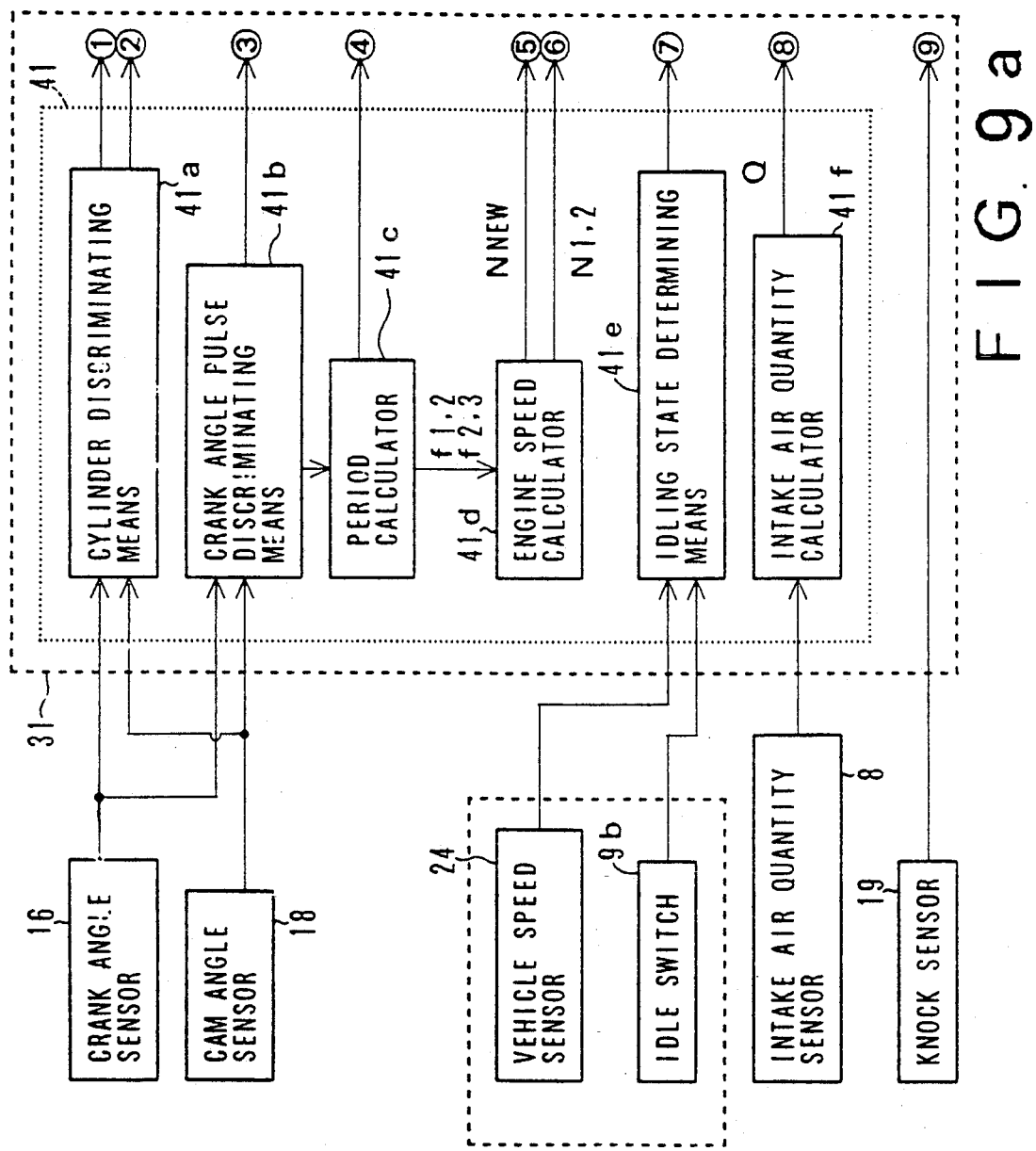
FIGS. 9a to 9c show the block diagram showing the system of a second embodiment of the present invention.
Figure 9B:
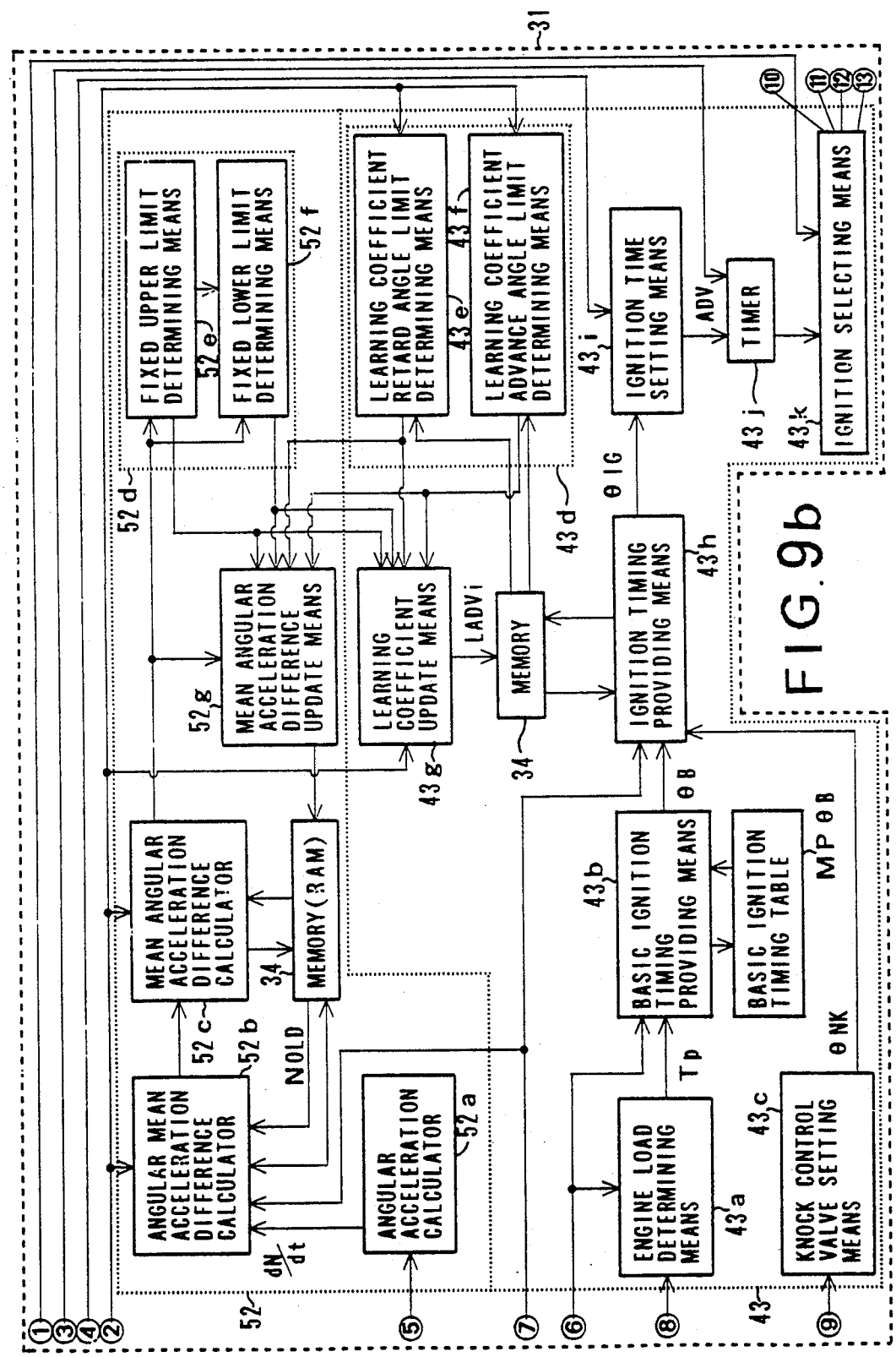
Figure 9C:
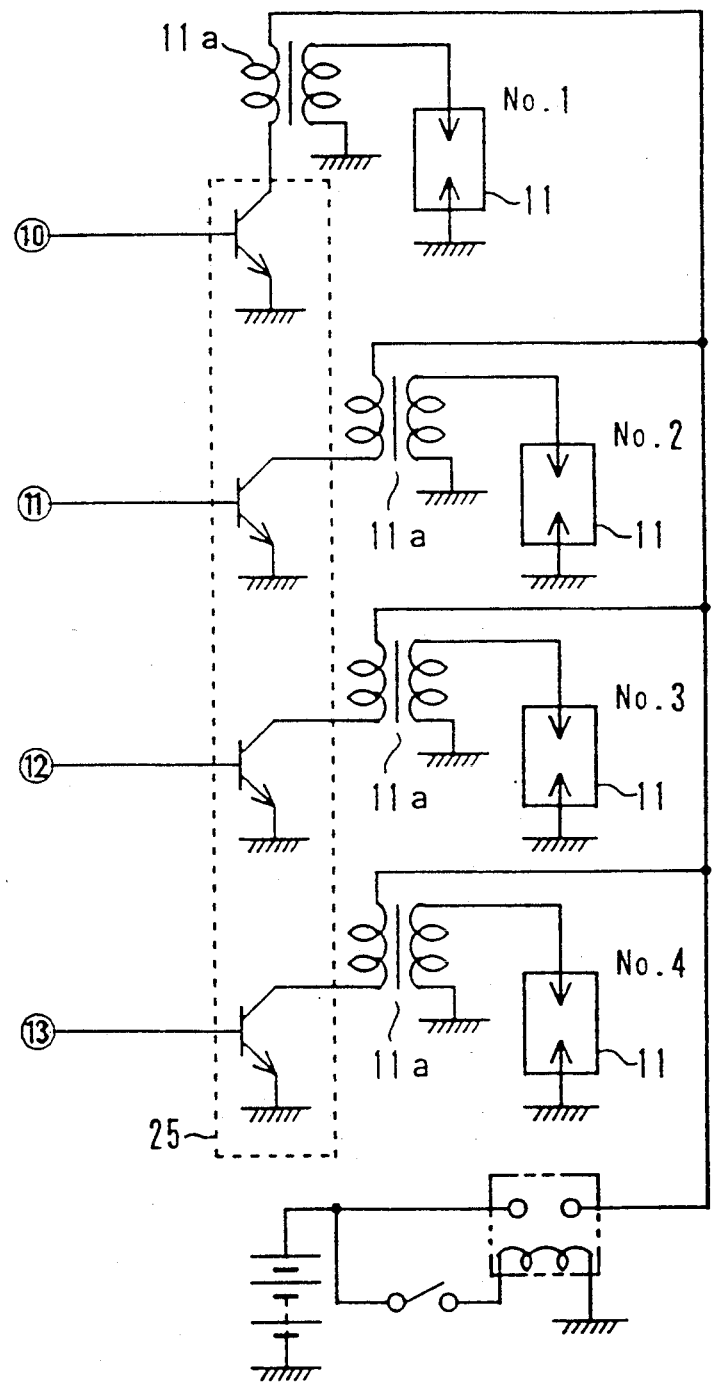
Figure 10A:
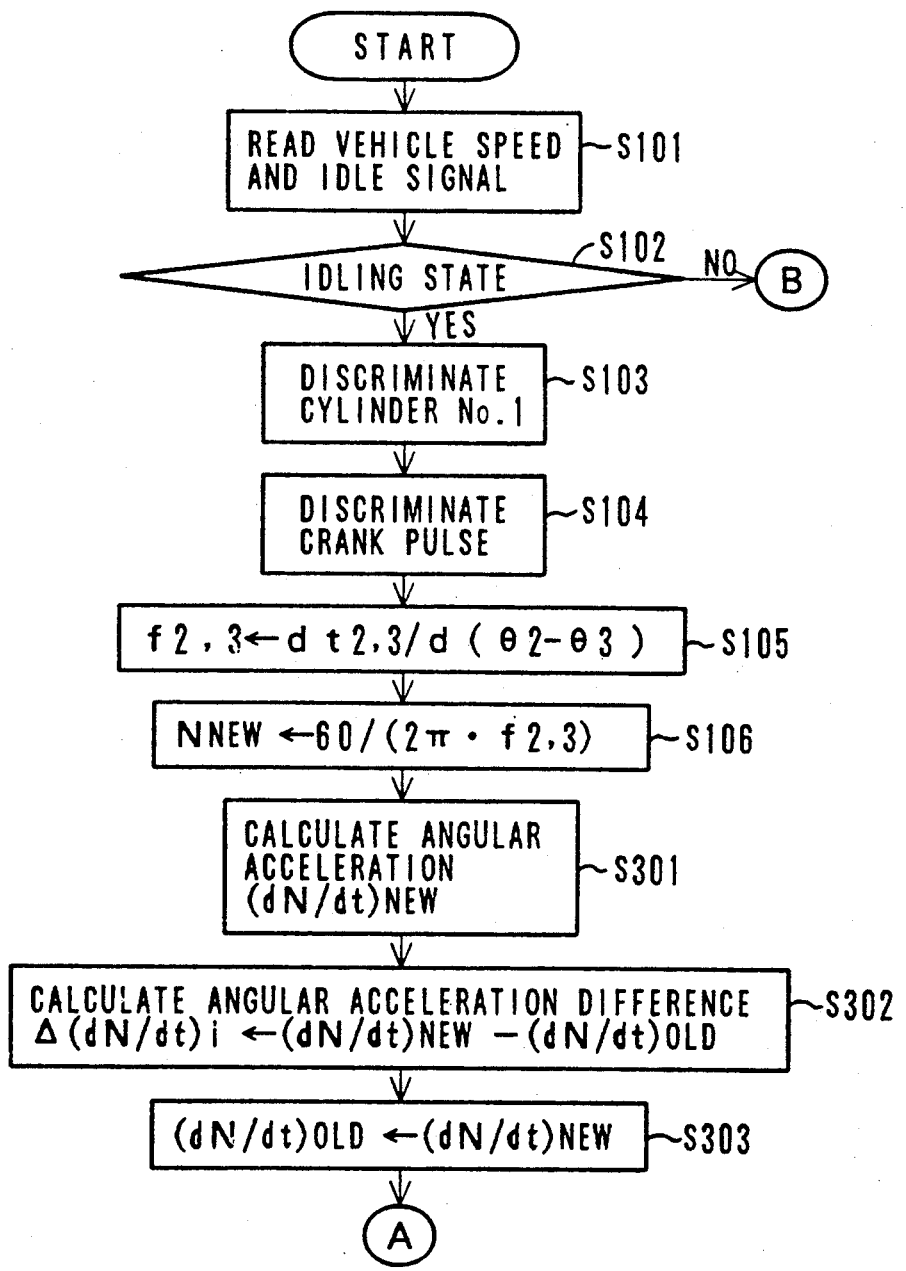

Referring to FIGS. 9 to 11 showing the second embodiment, the same structure and steps as the first embodiment are identified with the same reference numerals as FIGS. 2 and 7 and the descriptions thereof are omitted.

In the second embodiment, the combustion condition is estimated in accordance with an angular acceleration of the engine.

Referring to FIG. 9, a combustion condition estimating section 52 comprises an angular acceleration calculator 52a to which the engine speed N NEW from the engine speed calculator 41d is applied for calculating angular acceleration (dN/dt)NEW. When the idling of the engine is determined at the idling state determining means 41e, an angular acceleration difference calculator 52b reads an angular acceleration (dN/dt)NEW calculated at the calculator 52a, and reads an angular acceleration (dN/dt)OLD stored in a predetermined address of the memory (RAM) 34, which is calculated in the last routine. The calculator 52b calculates the angular acceleration difference $\Delta(dN/dt)i$ of the corresponding cylinder No. i discriminated at the cylinder discriminating means 41a in accordance with the difference between the angular acceleration (dN/dt)NEW and (dN/dt)OLD ( $\Delta(dN/dt)i = (dN/dt)NEW - (dN/dt)OLD$).

The angular acceleration (dN/dt)NEW is stored in the memory 34 to update the angular acceleration (dN/dt)OLD ((dN/dt)OLD ← (dN/dt)NEW).

The angular acceleration difference $\Delta(dN/dt)i$ is applied to a mean angular acceleration difference calculator 52c in which the mean angular acceleration difference $\Delta(dN/dt)Ai$ at the detecting period for the corresponding cylinder No. i is calculated in accordance with the angular acceleration difference $\Delta(dN/dt)i$ and the last mean angular acceleration difference $\Delta(dN/dt)Ai(-1)$ stored in a predetermined address of the memory 34 through the weighted mean by the equation as follows.

$$\Delta(dN/dt)Ai = ((2^r - 1) \times \Delta(dN/dt)Ai(-1) + \Delta(dN/dt)i)/2^r$$

where r is a i weighted coefficient.

The mean angular acceleration difference at the first time is zero.

The mean angular acceleration difference $\Delta(dN/dt)Ai$ is calculated at every detecting period for the respective cylinders.

The calculating operation which will be described hereinafter is performed based on data for each cylinder.

The mean angular acceleration difference $\Delta(dN/dt)Ai$ is applied to a combustion condition estimating means 52d having fixed upper limit determining means 52e and fixed lower limit determining means 52f. The mean angular acceleration difference $\Delta(dN/dt)Ai$ is compared with a fixed upper limit angular acceleration difference $\Delta(dN/dt)u$ which is previously provided in the means 52e. When $\Delta(dN/dt)Ai \leq \Delta(dN/dt)u$, the mean angular acceleration difference $\Delta(dN/dt)Ai$ is compared with a fixed lower limit angular acceleration difference $\Delta(dN/dt)L$ which is previously provided in the means 52f.

These upper and lower fixed limit values $\Delta(dN/dt)u$ and $\Delta(dN/dt)L$ are determined based on the upper and lower determining values of the indicated mean effective pressure obtained by an experiment.

When $\Delta(dN/dt)Ai \geq \Delta(dN/dt)L$ at the fixed lower limit determining means 52f, namely the mean angular acceleration difference $\Delta(dN/dt)Ai$ is within the range of the fixed limit angular acceleration difference ( $\Delta(dN/dt)u \geq \Delta(dN/dt)Ai \geq \Delta(dN/dt)L$), a signal is applied to mean angular acceleration difference update means 52g. The update means 52f operates to update the last mean angular acceleration difference $\Delta(dN/dt)Ai(-1)$ stored in the memory 34 with the mean angular acceleration difference $\Delta(dN/dt)Ai$, $\Delta(dN/dt)Ai(-1)$ ← $\Delta(dN/dt)Ai$.

If $LADVi \leq LmtRTD$ or $LADVi \geq LmtADV$ is determined at the learning coefficient retard angle and the advance angle limit determining means 43e and 43f, the signal is applied to the mean difference update means 52g for resetting the mean angular acceleration difference $\Delta(dN/dt)Ai$ ( $\Delta(dN/dt) Ai$ ← 0). Thus, the update mans 52g operates to update the last mean angular acceleration difference $\Delta(dN/dt)Ai(-1)$ in the memory 34 by the reset means angular acceleration difference $\Delta(dN/dt)Ai$ ( $\Delta(dN/dt)Ai(-1)$ ← 0).

The learning correcting coefficient update means 43g is applied with the signals from the fixed upper limit determining means 52e and the fixed lower limit determining means 52f of the combustion condition estimating means 52d. When $\Delta(dN/dt)Ai > \Delta(dN/dt)u$ at the means 52e, i.e. the combustion condition is extremely good, the learning correcting coefficient LADVi is corrected to retard with the crank angle C. The update means 43g operates to update the learning coefficient LADVi with the retarded coefficient (LADVi ← LADVi − C).

When $\Delta(dN/dt)Ai < (DN/dt)L$ at the fixed lower limit determining means 52f, i.e. the combustion condition is bad, the learning coefficient LADVi is corrected to advance with the crank angle C. The coefficient LADVi is updated with the advanced coefficient (ALDVi ← LADVi + C).

The operation of the system for estimating the combustion condition of the cylinder at idling of the engine is described hereinafter with reference to the flowchart of FIG. 10. The control program is executed on each individual cylinder At the steps S101 to S106, the same programs as the first embodiment are executed. After the engine speed N NEW is calculated in accordance with the frequency f2.3 (N NEW ← 60/(2π· f2.3) at the step S106, the program goes to a step S301 where the angular acceleration (dN/dt)NEW is calculated in accordance with the engine speed N NEW.

At a step S302, in accordance with the difference between the angular acceleration (dN/dt)NEW and the angular acceleration (dN/dt)OLD calculated in the last routine, the angular acceleration difference $\Delta(dN/dt)i$ in the non-working period (FIG. 11) is calculated ( $\Delta(dN/dt)i$ ← (dN/dt)NEW − (dN/dt)OLD). At a step S303, the angular acceleration (dN/dt)OLD stored in the memory is updated with the angular acceleration (dN/dt)NEW ((dN/dt)OLD ← (dN/dt)NEW).

At a step S304, the mean angular acceleration $\Delta(dN/dt)Ai$ is calculated through the weighted mean based on the angular acceleration difference $\Delta(dN/dt)i$ and mean angular acceleration difference $\Delta(dN/dt)Ai(-1)$ in the last routine ( $\Delta(dN/dt)Ai \leftarrow ((2^r - 1) \times \Delta(dN/dt)Ai(-1) + \Delta(dN/dt))/2^r)$.

At a step S305, the mean angular acceleration difference $\Delta(dN/dt)$ is compared with fixed upper limit angular acceleration difference $\Delta(dN/dt)u$. When $\Delta(dN/dt)Ai > \Delta(dN/dt)u$, it is determined that the combustion condition is extremely good. The program goes to the steps S111 to S113 where the learning correcting coefficient LADVi is updated in the same programs as the first embodiment.

On the other hand, at the step S305, when $\Delta(dN/dt)Ai \leqq \Delta(dN/dt)u$, the program goes to a step S306 where the mean difference $\Delta(dN/dt)Ai$ is compared with the fixed lower limit $\Delta(dN/dt)L$. When $\Delta(dN/dt)Ai < \Delta(dN/dt)L$, it is determined that the combustion condition is bad. The program goes to steps S115 to S117 where the learning correcting coefficient LADVi in the RAM 34 is updated in the same programs as the first embodiment.

At the step S306, when $\Delta(dN/dt)Ai \geqq (dN/dt)L$, it is determined that the mean angular acceleration difference $\Delta(dN/dt)Ai$ is in the range ( $\Delta(dN/dt)u > \Delta(dN/dt)Ai \geqq \Delta(dN/dt)L$), the program proceeds to the step S308.

At a step S307, the last mean angular acceleration difference $\Delta(dN/dt)Ai$ is reset ( $\Delta(dN/dt)Ai \leftarrow 0$).

At the step S308, the last mean angular acceleration difference $\Delta(dN/dt)Ai$ (−1) stored in the RAM is updated with the mean angular acceleration difference $\Delta(dN/dt)Ai$ calculated at the step S304 or reset at the step S307.

The operation for controlling the ignition timing is the same as the first embodiment.

The correlation between engine speed and angular acceleration is shown in FIG. 11. In the second embodiment, the combustion condition is estimated in accordance with the angular acceleration obtained by the engine speed by the time differential. Thus, the time element is added, and hence accuracy of the system is further improved.

Figure 12A:
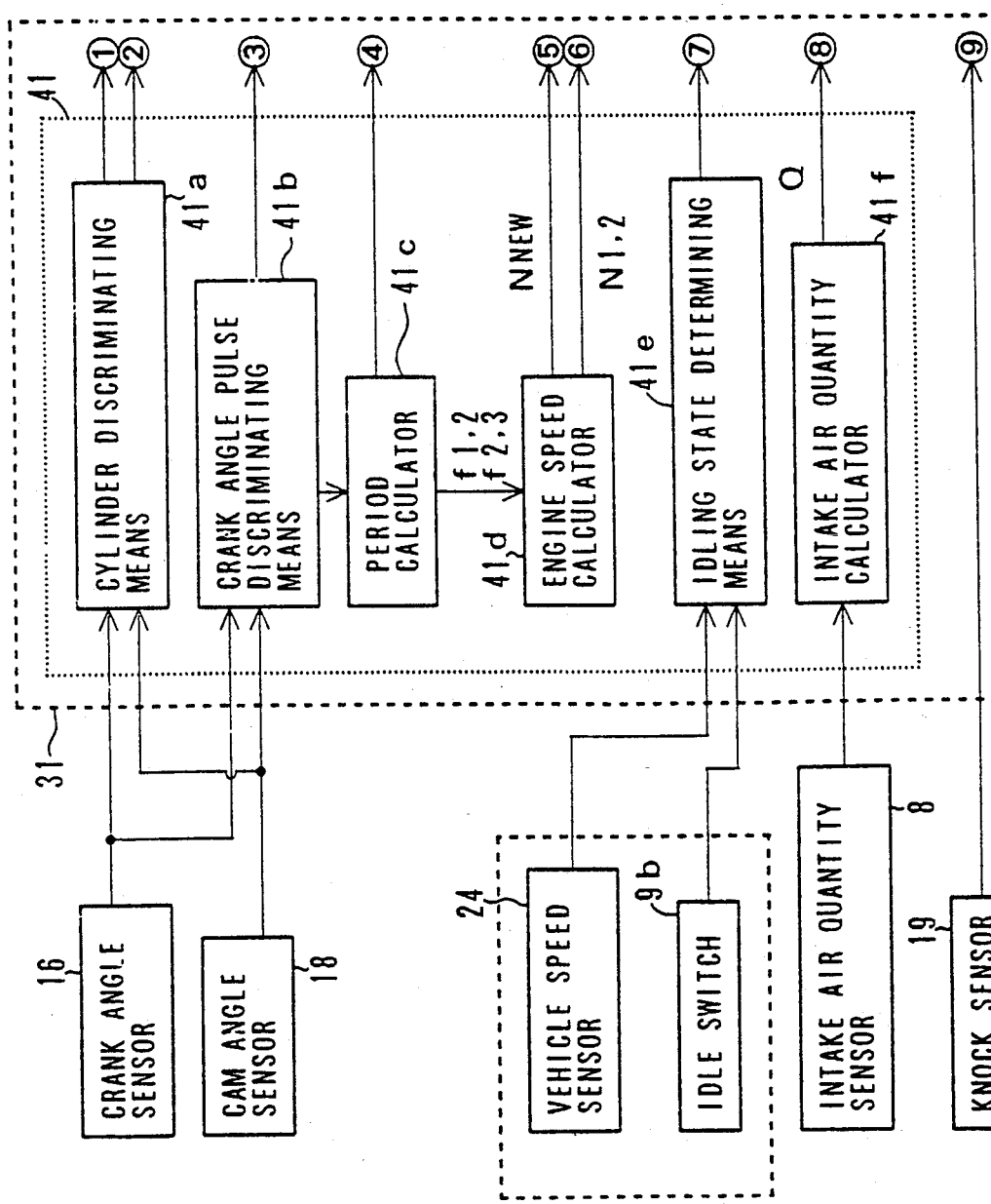
FIGS. 12a to 12c show the block diagram of a third embodiment of the present invention.
Figure 12B:
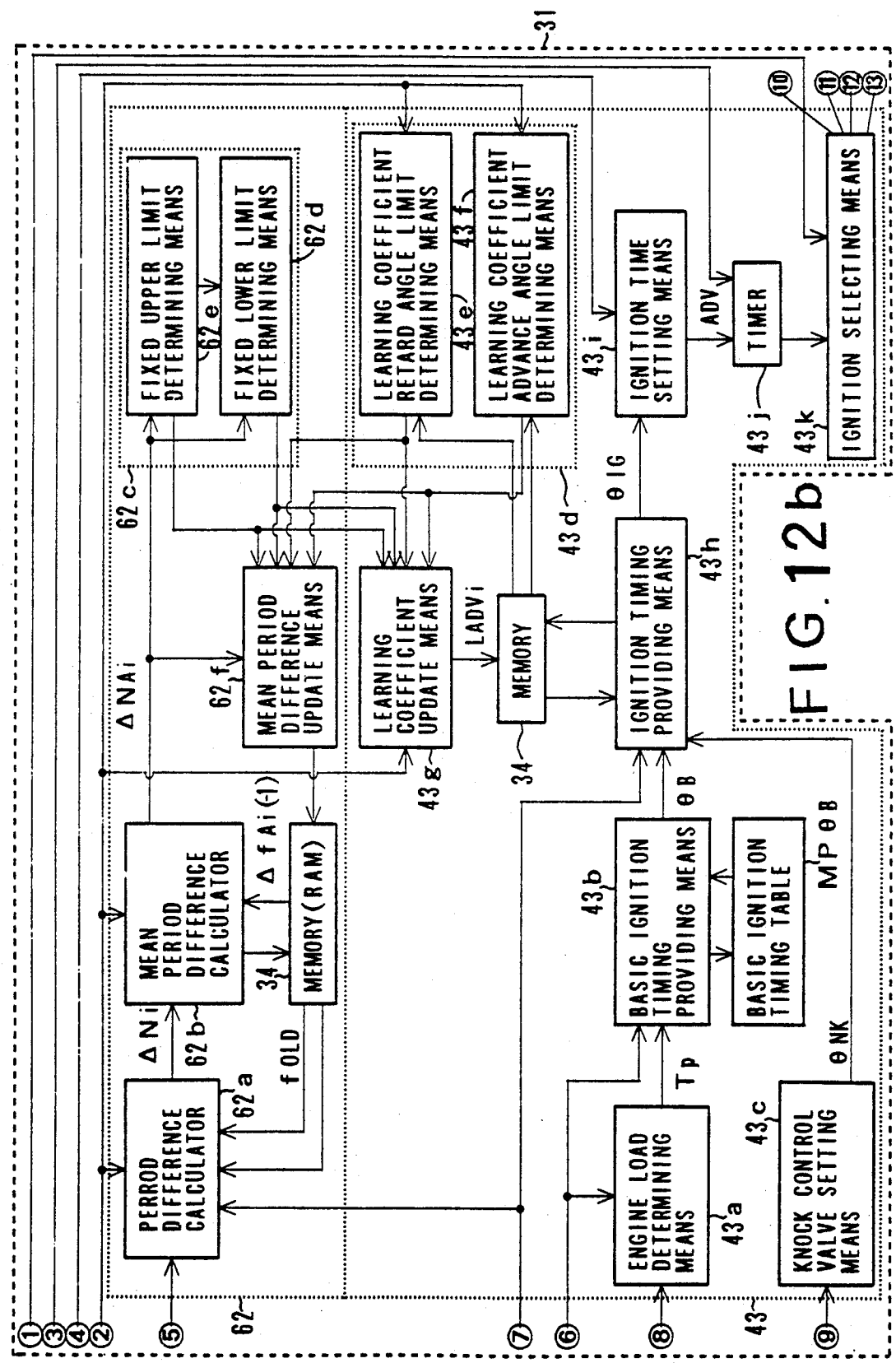
Figure 12C:
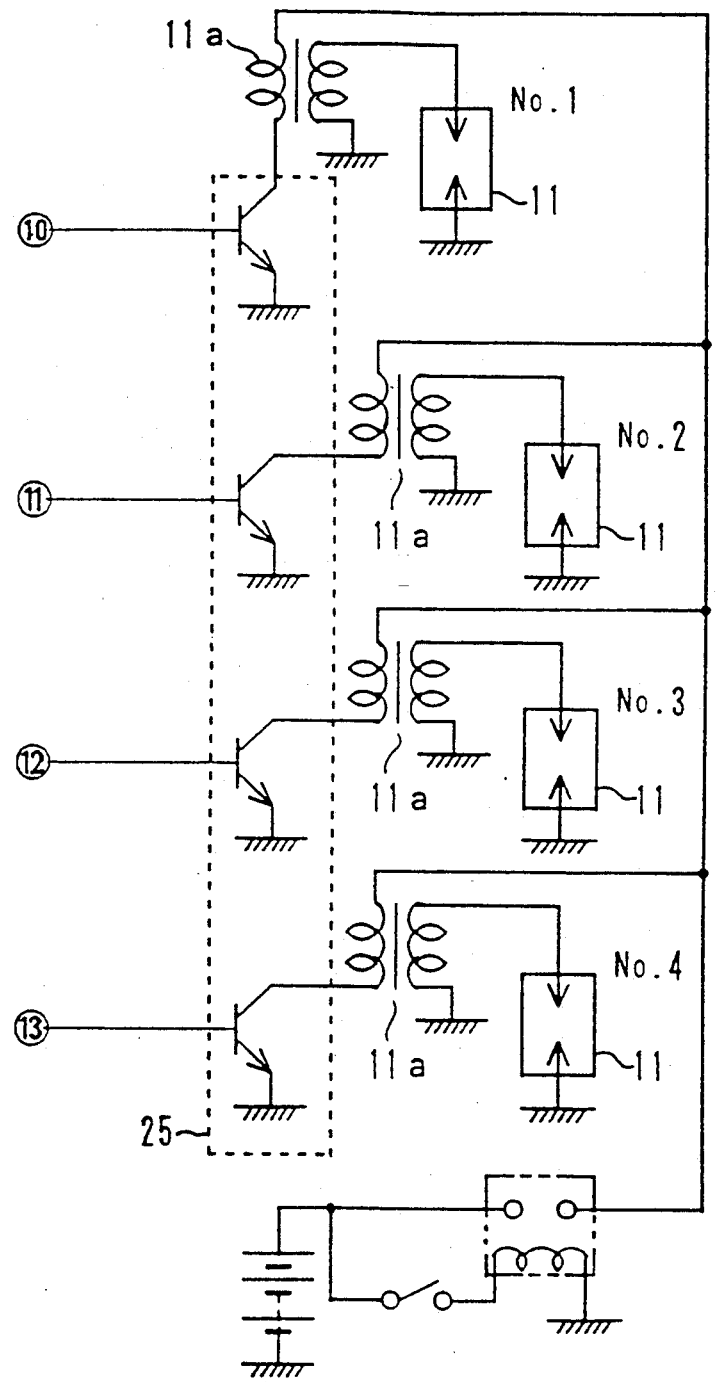

Referring to FIGS. 12 and 13 showing the third embodiment, the same structure and steps as the first embodiment are identified with the same reference numerals as FIGS. 2 and 7 and the descriptions thereof are omitted.

In the third embodiment, the combustion condition is estimated in accordance with a periodic phase (cycle) of the engine operation.

Referring to FIG. 12, a combustion condition estimating section 62 comprises a period difference calculator 62a which calculates a period difference $\Delta fi$ (i=1,3,2,4) of the corresponding cylinder at idling of the engine. When idling of the engine is determined at the idling state determining means 41e, the calculator 62a reads period f2.3 NEW calculated at the period calculator 41c, and reads period f2.3 OLD stored in the memory 34, which is calculated in the last routine. The calculator 62a calculates the period difference $\Delta fi$ of the corresponding cylinder No. i in accordance with the difference between the periods f2.3 NEW and f2.3 OLD ( $\Delta fi$ = f2.3 NEW − f2.3 OLD).

The period f.23 NEW is stored in the memory 34 to update the period f2.3 OLD (f2.3 OLD ← f2.3 NEW).

The period difference $\Delta fi$ is applied to a mean period difference calculator 62b in which a mean period difference $\Delta fAi$ at the detecting period for the corresponding cylinder No. i is calculated in accordance with the period difference fi and the last mean period difference $\Delta fAi(-1)$ stored in the memory 34 through the weighted mean by the equation as follows.

$$\Delta fAi = ((2^r - 1) \times \Delta fAi(-1) + \Delta fi)/2^r$$

The mean period difference at the first time is zero.

The mean period difference $\Delta fAi$ is calculated at every detecting period for respective cylinders.

The mean period difference $\Delta fAi$ is applied to a combustion condition estimating means 62c having fixed lower limit determining means 62d and fixed upper limit determining means 62e. The mean period difference $\Delta fAi$ is compared with a fixed lower limit period difference $\Delta fL$ which is previously provided in the means 42d.

When $\Delta fAi \geqq fL$ at the fixed lower limit determining means 62d, the mean difference $\Delta fAi$ is compared with a fixed upper limit period difference $\Delta fu$ which is previously provided in the means 62e.

Since the period f is an inverse number of the engine speed, the fixed upper and lower limits of the period are inversely determined from those of the engine speed. When $\Delta fAi \leqq \Delta fu$, namely the mean period difference $\Delta fAi$ is within the range of the fixed limit period difference ( $\Delta fL \leqq \Delta fAi \leqq fu$), a signal is applied to mean period difference update means 62f. The update means 62f operates to update the last mean period difference $\Delta fAi(-1)$ stored in the memory 34 with the mean period difference $\Delta fAi$ ( $\Delta fAi(-1) \leftarrow fAi$).

If LADVi $\leqq$ LmtRTD or LADVi $\geqq$ LmtADV is determined at the learning coefficient limit determining means 43e or 43f, the mean period difference update means 62f is applied with the signal for resetting the mean period difference $\Delta fAi$ ( $\Delta fAi \leftarrow 0$). Thus, the last mean period difference $\Delta fAi(-1)$ in the memory 34 is updated by the reset means period difference $\Delta fAi$ ( $\Delta fAi(-1) \leftarrow 0$).

Signals from the fixed lower limit determining means 62d and the fixed upper limit determining means 62e are applied to the learning correcting coefficient update means 43g.

When $\Delta fAi > \Delta fL$ at the fixed lower limit determining means 62d, i.e. when the combustion condition is extremely good, the update means 43g operates to update the learning coefficient LADVi with the retarded learning coefficient which is corrected to retard with the crank angle C (LADVi ← LADVi − C).

When $\Delta fAi < \Delta fu$ at the upper limit determining means 62e, i.e. when the combustion condition is bad, the learning correcting coefficient LADVi is updated with the advanced learning coefficient which is corrected to advance with the crank angle C (LADVi ← LADVi + C).

Describing the operation for estimating the combustion condition at the idling state, referring to FIG. 13, at the step S105, the period f2.3 is calculated.

At a step S401, in accordance with the difference between the period f2.3 NEW and the period f2.3 OLD calculated in the last routine, the period difference $\Delta fi$ in the non-working period is calculated ( $\Delta fi \leftarrow$ f2.3 NEW − f2.3 OLD). At a step S402, the period f2.3 OLD stored in the memory is updated with the period f2.3 NEW (f2.3 OLD − f2.3 NEW).

At a step S403, the mean period difference $\Delta fAi$ is calculated through the weighted mean based on the period difference $\Delta fi$ and the means period difference $\Delta fAi$ (−1) in the last routine ( $\Delta fAi \leftarrow ((2^r - 1) \times \Delta fAi(-1) + \Delta fi)/2^r)$.

At a step S404, the mean period difference ΔfAi is compared with the fixed lower limit ΔfL. When ΔfAi < ΔfL, it is determined that the combustion condition is extremely good. The program goes to the steps S111 to S113 where the learning correcting coefficient LADVi is updated.

On the other hand, at the step S404, when ΔfAi ≧ ΔfL, the program goes to a step S405 where the mean period difference ΔfAi is compared with the fixed upper limit Δfu. When ΔfAi > Δfu, it is determined that the combustion condition is bad. The program goes to the steps S115 to S117 where the learning correcting coefficient LADVi is updated.

At the step S405, when ΔfAi ≦ Δfu, it is determined that the mean period difference ΔfAi is in the range ( ΔfL ≦ ΔfAi ≦ Δfu), the program proceeds to the step S407.

At a step S406, the mean period difference ΔfAi is reset ( ΔfAi ← 0).

At the step S407, the last mean period difference ΔfAi (−1) stored in the RAM is updated with the mean period difference ΔfAi calculated at the step S403 or reset at the step S406.

In the third embodiment, the period is used for estimating the combustion condition so that the calculating process is reduced to reduce the calculating time.

Figure 14A:
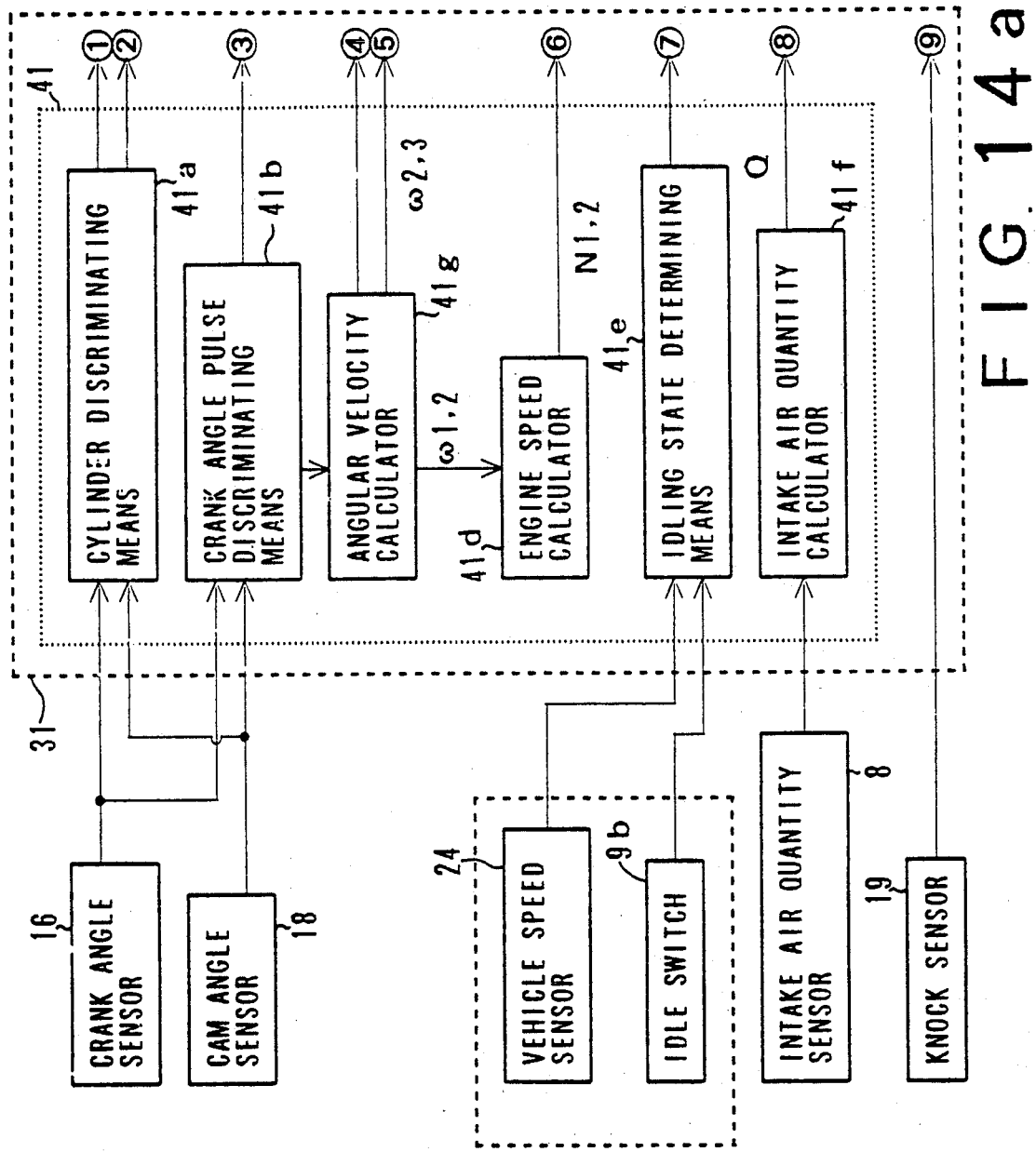
FIGS. 14a to 14c show the block diagram of a fourth embodiment of the present invention.
Figure 14B:
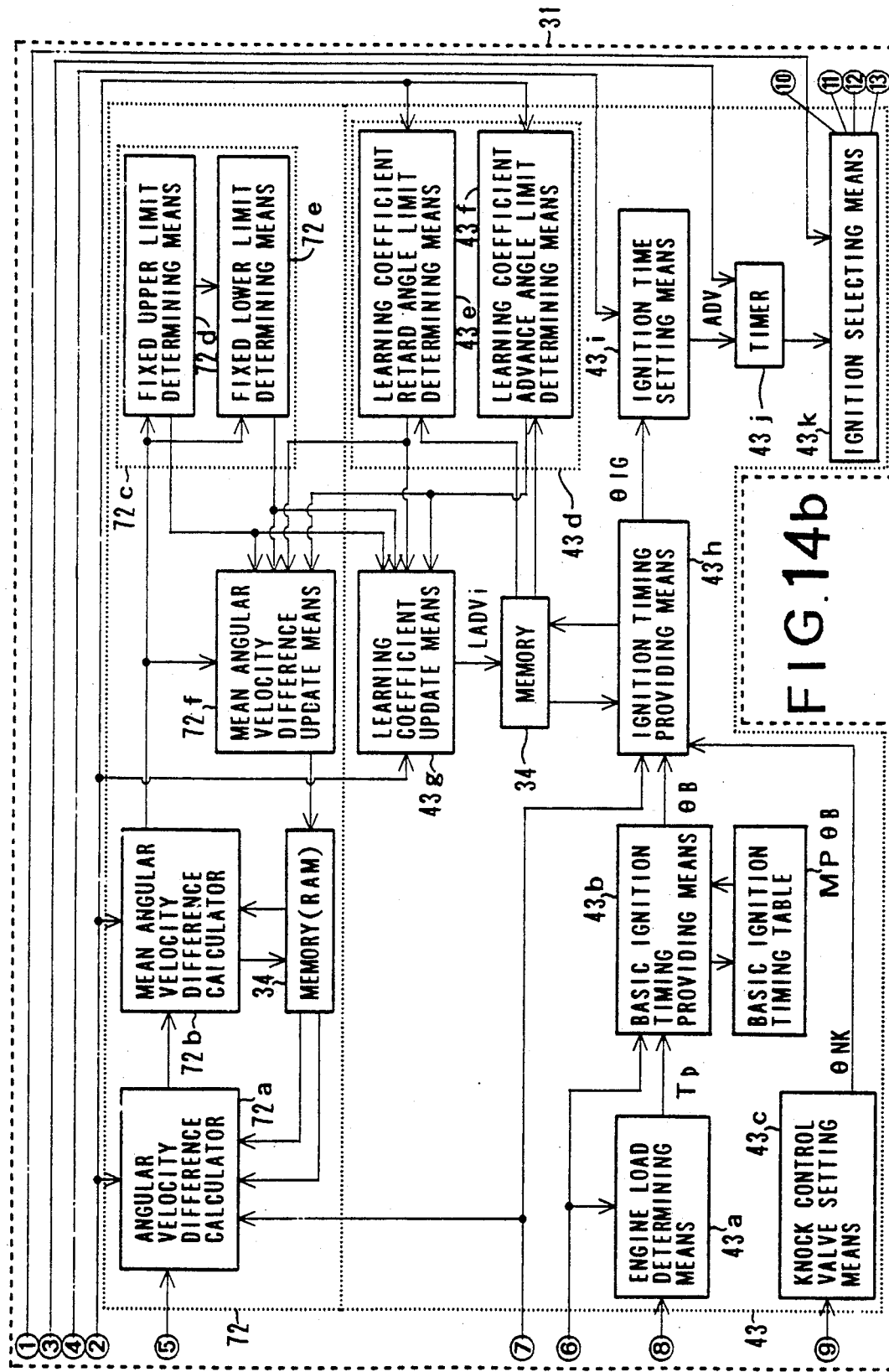
Figure 14C:
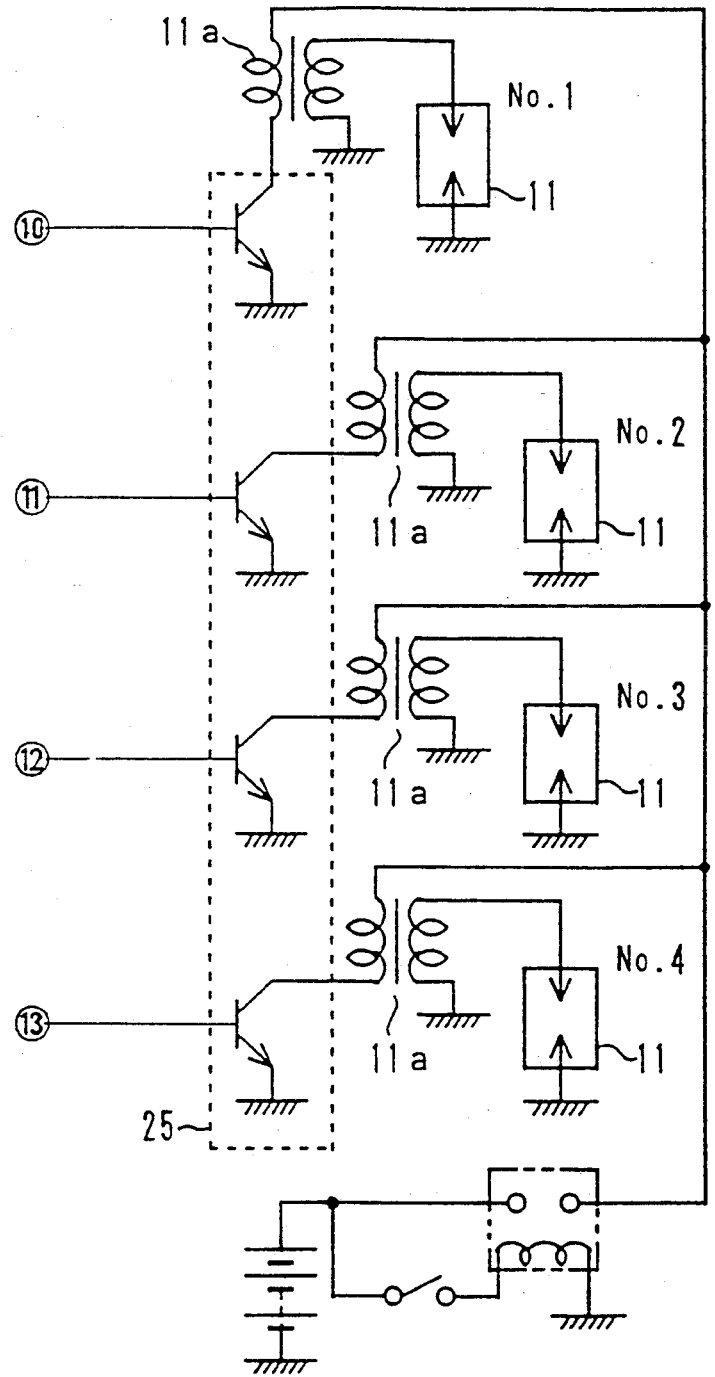
Figure 15:
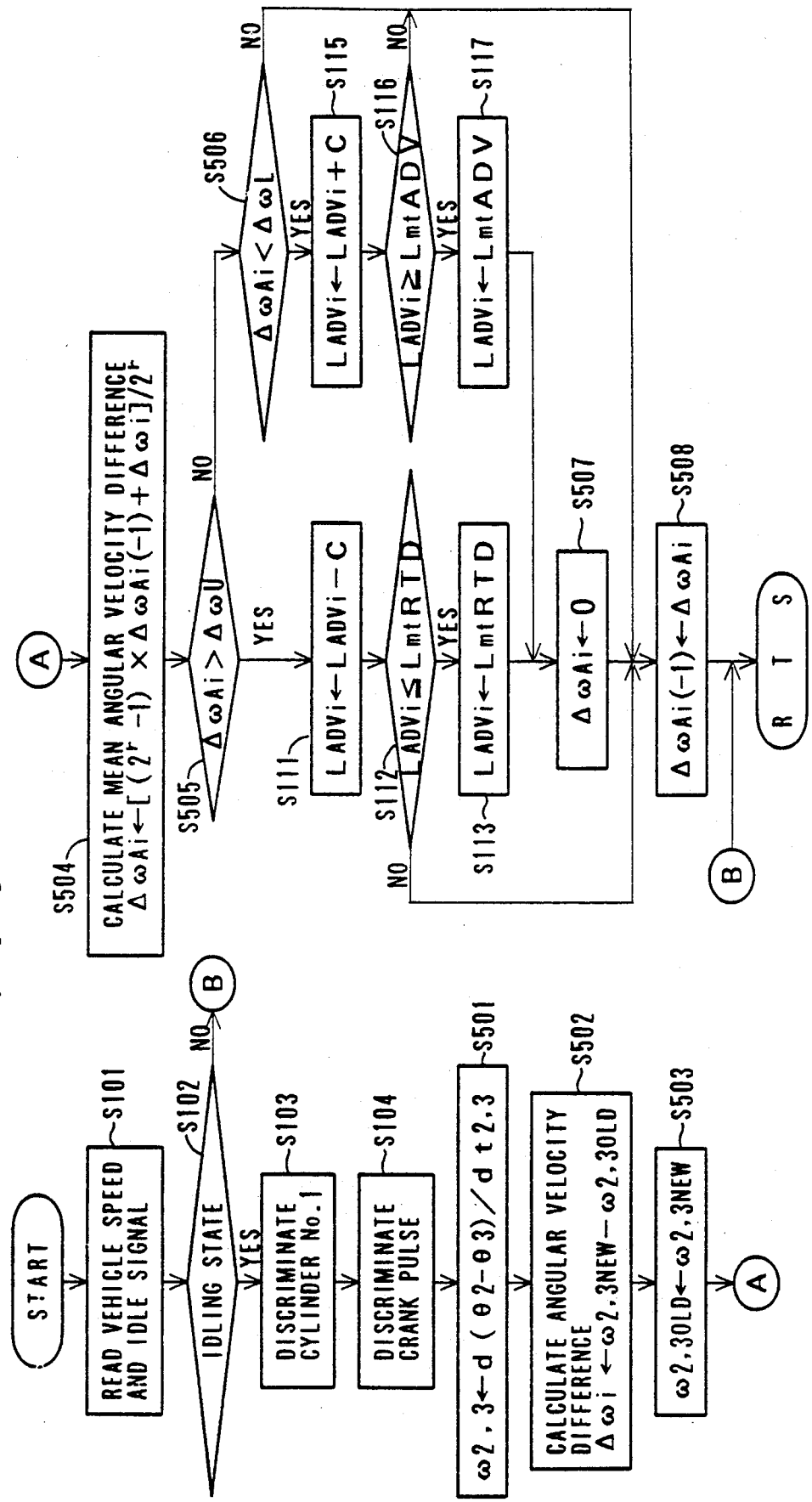
FIG. 15 is the flowchart of the operation for detecting the combustion condition of the fourth embodiment.

Referring to FIGS. 14 to 16 showing the fourth embodiment, the same structure and steps are identified with the same reference numerals as FIGS. 2 and 7 and the descriptions thereof are omitted.

In the fourth embodiment, the combustion condition is estimated in accordance with an angular velocity of the engine.

Referring to FIG. 14, the input data calculating section 41 is provided with an angular velocity calculator 41g to which the signal from the crank angle signal discriminating means 41b is applied. The calculator 41g measures the elapsed time t12 between the crank angle $\theta 1$ of the projection 15a and the crank angle $\theta 2$ of the projection 15b. The angular velocity $\omega$ 1.2 is calculated in accordance with the elapsed time t1.2 and the included angle $(\theta 1 - \theta 2)$ ($\omega$ 1.2 ← $d(\theta 1 - \theta 2)/dt1.2$). Then, the elapsed time t2.3 between the crank angle $\theta 2$ of the projection 15b and the crank angle $\theta 3$ of the projection 15c is measured. The angular velocity $\omega$ 2.3 is calculated in accordance with the elapsed time t2.3 and the included angle $(\theta 2 - \theta 3)$ ( $\omega$ 2.3 ← $d(\theta 2 - \theta 3)/dt2.3$). An angular velocity signal is applied to the engine speed calculator 41d for calculating the engine speed N1.2 based on the angular velocity $\omega$ 1.2 (N1.2 = 60 $\omega$1.2/(2$\pi$)).

The ignition time setting means 43i of the ignition timing calculating section 43 is applied with the ignition timing $\theta$IG and the angular velocity $\omega$1.2 calculated at the angular velocity calculator 41g. The means 43i operates to set an ignition time ADV in accordance with the ignition timing $\theta$IG and the angular velocity $\omega$ 1.2 (ADV = $\theta$IG/ $\omega$ 1.2).

The combustion state detecting section 72 comprises an angular velocity difference calculator 72a which calculates the angular velocity difference Δ ω i(i = 1, 3, 2, 4) of the corresponding cylinder at the idling of the engine. When the idling of the engine is determined, the calculator 72a calculates the angular velocity difference Δ ω i of the corresponding cylinder No. i in accordance with the difference between the angular velocities ω2.3 NEW and ω2.3 OLD (Δ ω i = ω 2.3 NEW − ω 2.3 OLD).

The angular velocity ω2.3 NEW is stored in the memory 34 to update the angular velocity ω 2.3 OLD ( ω 2.3 OLD ← ω 2.3 NEW).

The angular velocity difference Δ ω i is applied to a mean angular velocity calculator 72b in which a mean angular velocity difference Δ ω Ai at the detecting period for the corresponding cylinder No. i is calculated in accordance with the angular velocity difference Δ ω i and the last mean angular velocity difference Δ ω Ai(−1) stored in the memory 34 through the weighted mean by the equation as follows.

$$\Delta\omega Ai = ((2^r - 1) \times \Delta\omega Ai(-1) + \Delta\omega i)/2^r$$

The mean angular velocity difference at the first time is zero.

The mean difference ΔωAi is calculated at every detecting period for the respective cylinders.

The mean angular velocity difference ΔωAi is applied to a combustion condition estimating means 72c having fixed upper limit determining means 72d and fixed lower limit determining means 72e. The mean difference ΔωAi is compared with a fixed upper limit angular velocity difference Δω u at the means 72d and compared with a fixed lower limit difference Δω L at the means 72e, respectively.

When Δ ω u ≧ Δ ω Ai ≧ Δ ω L, the mean angular velocity difference ΔωAi is within the range of the fixed limit difference. The update means 72f operates to update the last mean difference Δω Ai(−1) stored in the memory 34 with the mean difference Δω Ai ( Δ ω Ai(−1) ← Δω Ai).

The update means 72f operates to update the last mean angular velocity difference Δω Ai(−1) in the memory 34 by the reset mean angular velocity difference Δω Ai, if LADVi ≦ LmtRTD or LADVi ≧ LmitADV is determined at the learning coefficient limit determining means 43e or 43f (Δω Ai(−1) ← 0).

When Δω Ai > Δ∫u at the means 72d, and when Δω Ai < Δ ω L at the means 72e, the update means 43g operates to update the learning coefficient LADVi with the corrected learning coefficient (LADVi ← LADVi − C or LADVi + C) in the same manner as the first embodiment.

Describing the operation, referring to FIG. 15, at the step S104, the crank pulses at the crank angles BTDC $\theta 2$ and $\theta 3$ are discriminated.

At a step S501, the angular velocity ω2.3 is calculated in accordance with the elapsed time t2.3 between crank pulses discriminated at the step S104 and the included angle $(\theta 2 - \theta 3)$ ( ω2.3 ← $d(\theta 2 - \theta 3)/dt2.3$).

At a step S502, in accordance with the difference between the angular velocities ω2.3 NEW and ω2.3 OLD, the angular velocity difference Δω i in the non-working period is calculated (Δω i ← ω2.3 NEW − ω2.3 OLD). At a step S503, the angular velocity ω2.3 OLD stored in the memory is updated with the angular velocity ω2.3 NEW ( ω2.3 OLD ← ω2.3 NEW).

At a step S504, the mean angular velocity difference Δω Ai is calculated through the weighted mean based on the angular velocity difference Δ ω i and the mean angular velocity difference Δω Ai(−1) in the last routine (ΔωAi ← (( $2^r$ − 1) × Δω Ai(−1) + Δωi)/$2^r$)

At a step S505, the mean difference Δω Ai is compared with a fixed upper limit difference Δωu. When Δω Ai > Δ ω u, it is determined that the combustion condition is extremely good. The program goes to the steps S111 to S113 for updating the learning correcting coefficient LADVi.

On the other hand, at the step S505, when $\Delta\omega Ai \leq \Delta\omega u$, the program goes to a step S506 where the mean difference $\Delta\omega Ai$ is compared with the fixed lower limit difference L. When $\Delta\omega Ai < \Delta\omega L$, it is determined that the combustion condition is bad. The program goes to the steps S115 to S117 for updating the learning coefficient.

At the step S506, when $\Delta\omega Ai \geq \Delta\omega L$, it is determined that the mean angular velocity difference $\Delta\omega Ai$ is in the range ($\Delta\omega u \geq \Delta\omega Ai \geq \delta \omega L$), the program proceeds to the step S508.

AT a step S507, the mean difference $\Delta\omega Ai$ is reset ($\Delta\omega Ai \leftarrow 0$).

At a step S508, the last mean angular velocity difference $\Delta\omega Ai(-1)$ stored in the RAM is updated with the mean angular velocity difference $\Delta\omega Ai$ calculated at the step S504 or reset at the step S507.

Figure 8:
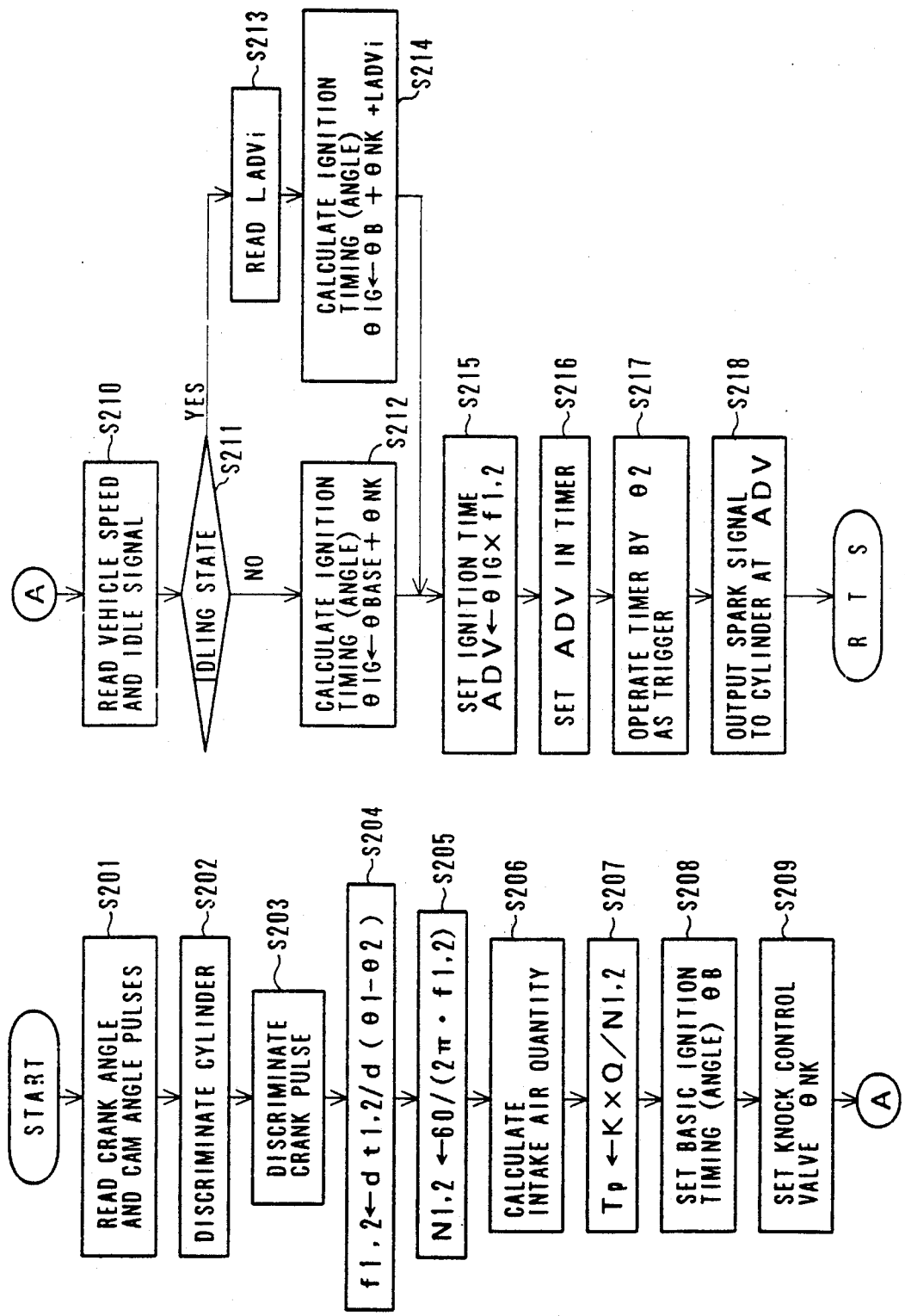
FIG. 8 shows the flowchart showing the ignition timing control of the system.

Referring to FIG. 8, in the operation for controlling the ignition timing, at step S203, the crank pulse is discriminated.

At a step S250, the angular velocity $\omega 1.2$ is calculated in accordance with the elapsed time t1.2 between the crank pulses discriminated at the step S203 and the angle ($\theta 1 - \theta 2$) ($\omega 1.2 \leftarrow d(\theta 1 - \theta 2)/dt1.2$). At a step S251, the engine speed N1.2 is calculated in accordance with the angular velocity $\omega 1.2$ ($N1.2 \leftarrow (60/2\pi) \times \omega 1.2$)).

At a step S260, the ignition time ADV is provided in accordance with the ignition timing $\theta IG$ calculated at the step S212 or S214 and the angular velocity $\omega 1.2$ calculated at the step S250. (ADV $\leftarrow \theta IG/\omega 1.2$).

In the fourth embodiment, since the angular velocity is used, the calculating time is also reduced.

The system of the present invention may be employed for other engines such as a four-cycle single-cylinder engine, a four-cycle two-cylinder engine, a four-cycle three-cylinder engine, two-cycle single-cylinder engine, and a two-cycle two-cylinder engine, because the combustions of the cylinders do not overlap with each other.

In accordance with the present invention, the mean value of the difference of engine speed, angular acceleration, period, or angular velocity, each of which is correlated with the combustion condition of the cylinder, is compared with the fixed upper and the lower limit values. Thus, the combustion condition is determined as the absolute quantity so that the combustion condition of the corresponding cylinder can be accurately estimated.

The combustion condition is estimated on the basis of the signals from the sensors provided on the engine. The cost of the parts is reduced, and the system can be used for conventional engines.

The ignition timing is accurately controlled in dependency on the combustion condition of the corresponding cylinder. In particular, the engine speed at the idling state is stable, thereby reducing the noise and vibration of the engine.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A system for detecting a combustion condition of an internal combustion engine, the system having a plurality of cylinders, a crankshaft and a camshaft, comprising crank angle sensing means for producing a crank angle signal representing an angular position of the crankshaft of the engine;

cam angle sensing means for producing a cam angle signal representing angular position of the camshaft of the engine;

cylinder discriminating means responsive to said cam angle signal for discriminating a cylinder positioning immediately following an expansion stroke and for producing a discriminated cylinder signal;

engine speed detecting means responsive to said crank angle signal and said discriminated cylinder signal for detecting a first engine speed during a predetermined angle of crank rotation before the expansion stroke of said discriminated cylinder and a second engine speed during a predetermined angle of crank rotation after said expansion stroke;

engine speed difference means for calculating a difference between said first engine speed and said second engine speed of said discriminated cylinder;

storing means;

means difference calculating means responsive to said discriminated cylinder signal for calculating to said discriminated cylinder signal for calculating a means difference in engine speed in accordance with a weighted mean difference of engine speed stored in said storing means and said difference in each cylinder respectively to correct a measuring error and variation caused by temporary fluctuation;

comparing means responsive to said mean difference for comparing said mean difference with predetermined upper and lower values representing a predetermined range; and said storing means for storing said mean difference when said mean difference is within said predetermined range so as to accurately detect a combustion condition of each cylinder respectively.

2. The system according to claim 1, wherein said engine speed detecting means comprises:

crank angle signal discriminating means responsive to said crank angle signal and said cam angle signal for discriminating a second crank angle signal produced at a predetermined angle before top dead center and a third crank angle signal produced at another predetermined angle before said top dead center and for producing a second signal and a third signal;

period calculating means responsive to said second signal and said third signal for calculating a period between the second signal time and the third signal time and for producing a period signal representing said period; and engine speed calculating means responsive to said period signal for calculating said second engine speed according to said period and a difference between said predetermined angles.

3. The system according to claim 1, wherein said cylinders are ignited at an equal crank angle interval between each of the cylinders; and said second engine speed is the first engine speed of a next following expansion stroke cylinder.

4. A system for detecting combustion condition of an internal combustion engine, the system having cylinders, a crankshaft and a camshaft, comprising crank angle sensing means for producing a crank angle signal representing an angular position of the crankshaft of the engine;

cam angle sensing means for producing a cam angle signal representing an angular position of the camshaft of the engine;

cylinder discriminating means responsive to said cam angle signal for discriminating a cylinder positioning immediately following an expansion stroke and for producing a discriminated cylinder signal;

engine speed detecting means responsive to said crank angle signal and said discriminated cylinder signal for detecting a first engine speed during a predetermined angle of crank rotation before the expansion stroke of said discriminated cylinder and a second engine speed during a predetermined angle of crank rotation after said expansion stroke;

angular acceleration calculating means for calculating a first acceleration in accordance with said first engine speed and for calculating a second acceleration in accordance with said second engine speed;

an angular acceleration difference calculator for calculating a difference between said first acceleration and said second acceleration of said discriminated cylinder free of combustion pressure;

storing means;

mean difference calculating means responsive to said discriminated cylinder signal for calculating a mean difference in engine acceleration in accordance with a weighted mean difference of engine acceleration stored in said storing means and said difference in each cylinder respectively to correct a measuring error and variation caused by temporary fluctuation;

comparing means responsive to said mean difference for comparing said mean difference with predetermined upper and lower values representing a predetermined range; and said storing means for storing said mean difference when said mean difference is within said predetermined range so as to accurately detect a combustion condition of each cylinder respectively.

5. The system according to claim 4, wherein said engine speed detecting means comprises:

crank angle signal discriminating means responsive to said crank angle signal and said cam angle signal for discriminating a second crank angle signal produced at a predetermined angle before top dead center and a third crank angle signal produced at another predetermined angle before said top dead center and for producing a second signal and a third signal;

period calculating means responsive to second signal and said third signal for calculating a period between the second signal time and the third signal produced time and for producing a period signal representing said period; and engine speed calculating means responsive to said period signal for calculating said second engine speed according to said period and a difference between said predetermined angles.

6. The system according to claim 4, wherein said cylinders are ignited at an equal crank angle interval between each of the cylinders; and said second engine speed is the first engine speed of a next following expansion stroke cylinder.

* * * * *

UNITED STATES PATENT AND TRADEMARK OFFICE
CERTIFICATE OF CORRECTION

PATENT NO. : 5,222,394

DATED : June 29, 1993

INVENTOR(S) : Ryuichiro Imai

It is certified that error appears in the above-identified patent and that said Letters Patent is hereby corrected as shown below:

Column 20 line 27 correct "means" to --mean--

Signed and Sealed this

Fourteenth Day of June, 1994

Attest:

BRUCE LEHMAN

Attesting Officer

Commissioner of Patents and Trademarks